(12) United States Patent
Kallinger et al.

(10) Patent No.: US 8,705,319 B2
(45) Date of Patent: Apr. 22, 2014

(54) APPARATUS AND METHOD FOR RESOLVING AN AMBIGUITY FROM A DIRECTION OF ARRIVAL ESTIMATE

(71) Applicant: Fraunhofer-Gesellschaft zur Förderung der angewandten Forschung e.V., Munich (DE)

(72) Inventors: Markus Kallinger, Erlangen (DE); Giovanni Del Galdo, Heroldsberg (DE); Fabian Küch, Erlangen (DE); Oliver Thiergart, Fuerth (DE); Dirk Mahne, Nuremberg (DE); Achim Kuntz, Hemhofen (DE); Richard Schultz-Amling, Nuremberg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 13/776,415

(22) Filed: Feb. 25, 2013

(65) Prior Publication Data

US 2013/0170319 A1 Jul. 4, 2013

Related U.S. Application Data

(63) Continuation of application No. PCT/EP2011/064436, filed on Aug. 23, 2011.

(60) Provisional application No. 61/377,671, filed on Aug. 27, 2010.

(30) Foreign Application Priority Data

Nov. 23, 2010 (EP) .................................. 10192238

(51) Int. Cl.
*G01S 3/802* (2006.01)
(52) U.S. Cl.
USPC ........................................................ 367/118
(58) Field of Classification Search
USPC ........................................................ 367/118
See application file for complete search history.

(56) References Cited

U.S. PATENT DOCUMENTS

| | | | | |
|---|---|---|---|---|
| 5,729,507 A | * | 3/1998 | Massa et al. | ................... 367/124 |
| 7,009,912 B1 | | 3/2006 | Haley | |
| 2013/0170319 A1 | * | 7/2013 | Kallinger et al. | ............. 367/118 |

FOREIGN PATENT DOCUMENTS

WO  WO/2012/025512  *  3/2012  ............. G01S 3/802

OTHER PUBLICATIONS

Kallinger et al., "Enhanced Direction Estimation Using Microphone Arrays for Directional Audio Coding", Hands-Free Speech Communication and Microphone Arrays, 2008. HSCMA 2008, IEEE, Piscataway, NJ, USA, May 6, 2008, pp. 45-48.*

(Continued)

*Primary Examiner* — Daniel Pihulic
(74) *Attorney, Agent, or Firm* — Michael A. Glenn; Perkins Coie LLP

(57) ABSTRACT

An apparatus for resolving an ambiguity from a DOA estimate includes a DOA estimate analyzer for analyzing the DOA estimate to obtain a plurality of ambiguous analysis parameters by using a bias information, the bias information representing a relation between a biased and an unbiased DOA estimate, and an ambiguity resolver for resolving the ambiguity in the plurality of ambiguous analysis parameters to obtain a non-ambiguous resolved parameter.

15 Claims, 21 Drawing Sheets

(56) References Cited

OTHER PUBLICATIONS

ISO/IEC 23003-1 2007, "Information Technology—MPEG Audio Technology", Part 1: MPEG Surround International Standards Organization, Geneva, Switzerland, 2007, Feb. 15, 2007.
Benjamin, "The Native B-ormat Microphone: Part I", AES, 119th Convention, Paper 6621, New York, Oct. 2005.
Elko, "Superdirectional Microphone Arrays", Editors: S.L. Gay and J. Benesty; Acoustic Signal Processing for Telecommunication; Chapter 10, Kluwer Academic Publishers, Norwell, MA; 2000, 181-235.
Faller, "Microphone Front-Ends for Spatial Audio Coders", AES, 125th Convention, Paper 7508, San Francisco, Oct. 2-5, 2008.
Kallinger, "A Spatial Filtering Approach for Directional Audio Coding", AES, 126th Convention, Paper 7653, Munich, May 2009.
Kallinger, "Analysis and adjustment of planar microphone arrays for application in Directional Audio Coding", AES, 124th Convention, Paper 7374, Amsterdam, May 2008.
Kallinger, "Enhanced Direction Estimation Using Microphone Arrays for Directional Audio Coding", IEEE HSCMA Workshop on Hands-Free Speech Communication and Microphone Arrays, Helsinki, Finland, 2008 2008.
Merimaa, "Applications of a 3-D Microphone Array", AES, 112th Convention, Paper 5501, Munich, May 2002.
Pulkki, "Spatial Sound Reproduction with Directional Audio Coding", J. Audio Eng. Soc., Helsinki Univ. of Technology, Finland; 55(6), Nov. 8, 2007, 503-516.
Thiergart, "Localization of Sound Sources in Reverberant Environments Based on Directional Audio Coding Parameters", AES, 127th Convention, Paper 7853, New York, Oct. 2009.

* cited by examiner

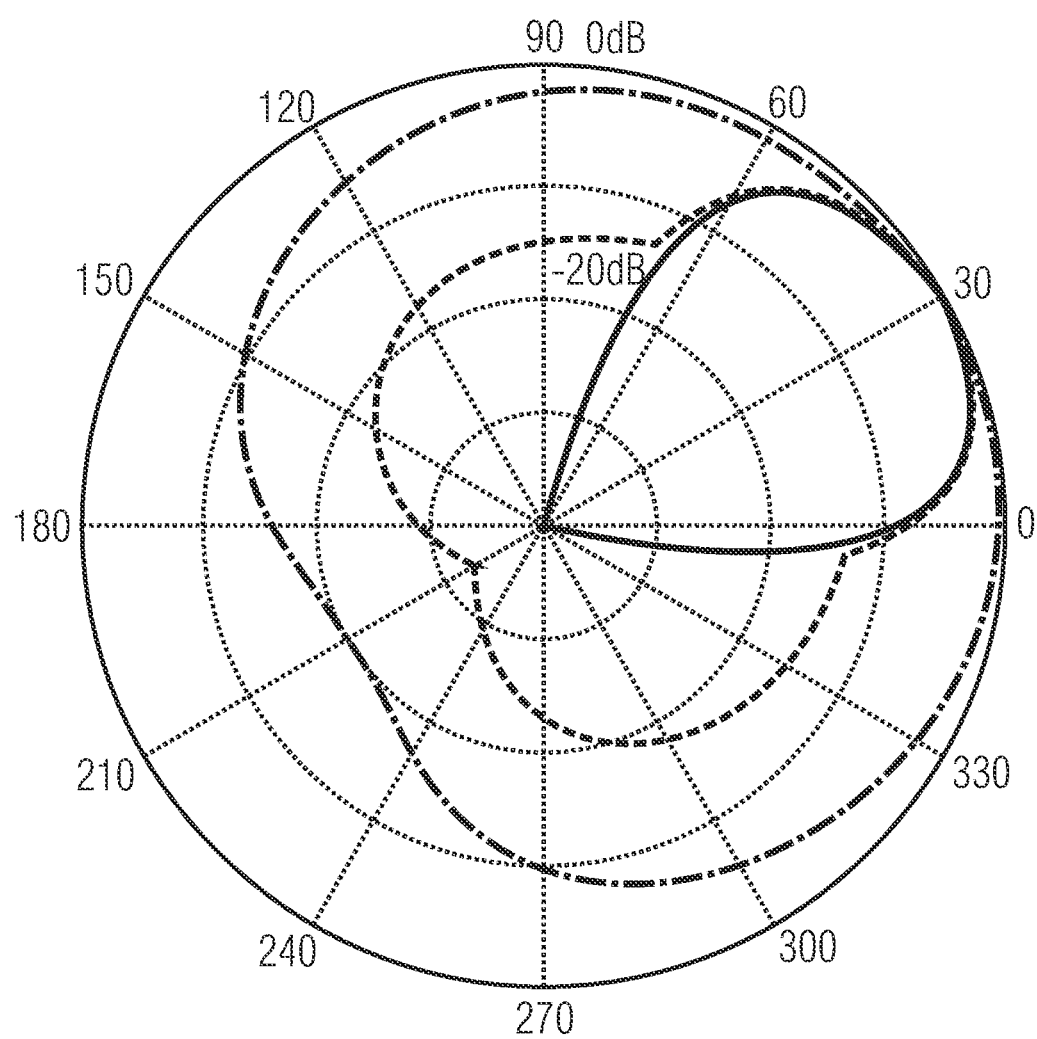
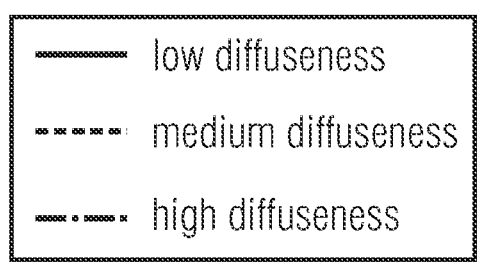
FIGURE 15

US 8,705,319 B2

APPARATUS AND METHOD FOR RESOLVING AN AMBIGUITY FROM A DIRECTION OF ARRIVAL ESTIMATE

CROSS-REFERENCE TO RELATED APPLICATIONS

This application is a continuation of copending International Application No. PCT/EP2011/064436, filed Aug. 23, 2011, which is incorporated herein by reference in its entirety, and additionally claims priority from U.S. Application No. 61/377,671, filed Aug. 27, 2010, and European Application EP 10192238.3, filed Nov. 23, 2010, which are all incorporated herein by reference in their entirety.

BACKGROUND OF THE INVENTION

The present invention generally relates to an apparatus and a method for resolving an ambiguity from a direction of arrival estimate. Further embodiments of the present invention relate to enhancing ambiguous spatial audio parameter estimation.

The present invention is settled in the context of spatial audio coding with a microphone front-end. We focus on parametric techniques, i.e., spatial sound is described by means of one or more audio signals accompanied with parametric side information. The side information is obtained on the basis of at least two microphones. Microphone arrangements and signal processing architectures are usually designed to cover a certain frequency range of interest, where desired specifications are strictly met. Beyond this area of interest notable deviations from the necessitated spatial selectivity might occur. An extreme deviation consists of so-called spatial aliasing. In the context of sound field analysis, the most important effect of spatial aliasing is that estimates of the direction of arrival of sound become ambiguous. Consequently, a certain behavior, which is expected or desired for only one certain direction, is also observed at one or more other directions.

The purpose of spatial audio coding consists of reproducing spatial acoustic scenes by means of few audio channels accompanied with parametric side information. Consequently, a general problem is that inaccurate parameter estimates will cause undesired results of the reproduction procedure or any other processing unit (e.g., for directional filtering), which makes use of the spatial parameters. This consideration applies to the above mentioned affected frequency ranges, especially where spatial aliasing occurs.

SUMMARY

According to an embodiment, an apparatus for resolving an ambiguity from a DOA estimate may have: a DOA estimate analyzer for analyzing the DOA estimate to obtain a plurality of ambiguous analysis parameters by using a bias information, the bias information representing a relation between a biased and an unbiased DOA estimate; and an ambiguity resolver for resolving the ambiguity in the plurality of ambiguous analysis parameters to obtain a non-ambiguous resolved parameter.

According to another embodiment, a method for resolving an ambiguity from a DOA estimate may have the steps of: analyzing the DOA estimate to obtain a plurality of ambiguous analysis parameters by using a bias information, the bias information representing a relation between a biased and an unbiased DOA estimate; and resolving the ambiguity in the plurality of ambiguous analysis parameters to obtain a non-ambiguous resolved parameter.

Another embodiment may have a computer program having a program code for performing the inventive method when the computer program is executed on a computer.

According to an embodiment of the present invention, an apparatus for resolving an ambiguity from a DOA estimate comprises a DOA estimate analyzer and an ambiguity resolver. The DOA estimate analyzer is configured for analyzing the DOA estimate to obtain a plurality of ambiguous analysis parameters by using a bias information. Here, the bias information represents a relation between a biased and an unbiased DOA estimate. Moreover, the ambiguity resolver is configured for resolving the ambiguity in the plurality of ambiguous analysis parameters to obtain a non-ambiguous resolved parameter.

The basic idea underlying the present invention is that an improved spatial parameter processing can be achieved if the DOA estimate is analyzed to obtain a plurality of ambiguous analysis parameters by using a bias information, the bias information representing a relation between a biased and an unbiased DOA estimate, and if the ambiguity in the plurality of ambiguous analysis parameters is resolved to obtain a non-ambiguous resolved parameter. This measure enables to resolve an ambiguity resulting from an inaccurate DOA parameter estimate caused by spatial aliasing.

According to further embodiments, the DOA estimate analyzer is configured to relate the DOA estimate to a plurality of ambiguous unbiased DOA estimates based on a bias function, wherein the bias function is indicated by the bias information. Here, the plurality of ambiguous unbiased DOA estimates corresponds to the plurality of ambiguous analysis parameters. Moreover, the ambiguity resolver is configured to determine the non-ambiguous resolved parameter from the plurality of ambiguous unbiased DOA estimates by using a priori localization information of one or more active sources. This essentially allows to obtain a specific or corrected DOA parameter from the a priori information about the position of a sound source.

According to further embodiments, the DOA estimate analyzer is configured to generate a plurality of branches for each ambiguous analysis parameter of the plurality of ambiguous analysis parameters, wherein the plurality of branches reflects the ambiguity in the plurality of ambiguous analysis parameters. Here, the DOA estimate analyzer is configured to directly obtain the plurality of branches from the DOA estimate or to further process a plurality of ambiguous unbiased DOA estimates to obtain the plurality of branches. In addition, the DOA estimate analyzer is configured to calculate gain parameters for a spectral weighting operation. Alternatively, the DOA estimate analyzer may also be configured to cause spectral modification by alternative means, e.g., addition, subtraction, or taking the logarithm that is similar to a spectral weighting operation. Moreover, the ambiguity resolver is configured to determine the non-ambiguous resolved parameter from the plurality of branches representing the ambiguous analysis parameters. Therefore, it is possible to obtain a suitable gain parameter for a spectral weighting operation such as a rendering or directional filtering operation in the field of directional audio coding. Moreover, by such a measure, it is not necessitated to acquire a priori localization information.

In a further embodiment, the DOA estimate analyzer is configured for obtaining the plurality of branches in a single processing step such that a processing result is provided, which would be obtained if two processing steps were performed consecutively. In particular, the DOA estimate analyzer may comprise, for each branch of the plurality of branches, a parameter processing unit, wherein the parameter processing unit may be configured to relate the DOA estimate to a predetermined ambiguous analysis parameter as indicated by the processing result. In this way, a higher processing efficiency or a reduction of the computational effort can be achieved when the ambiguity in the plurality of ambiguous analysis parameters is resolved.

A further embodiment of the present invention provides a method for resolving an ambiguity from a DOA estimate.

BRIEF DESCRIPTION OF THE DRAWINGS

Embodiments of the present invention will be detailed subsequently referring to the appended drawings, in which:

FIG. 15 shows an example directional pattern of direction filtering gain functions according to an embodiment of the present invention;

DETAILED DESCRIPTION OF THE INVENTION

Figure 1:
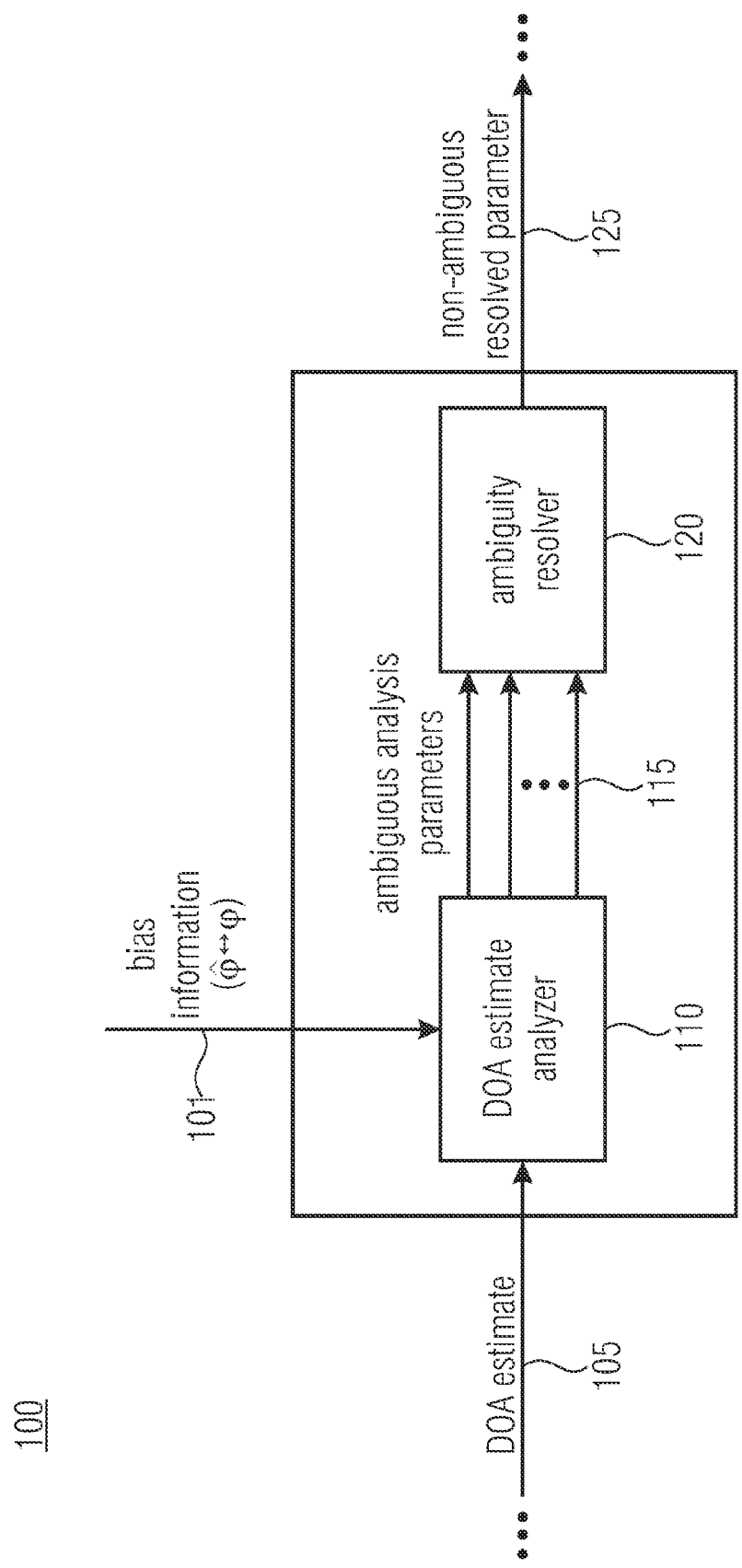
FIG. 1 shows a block diagram of an embodiment of an apparatus for resolving an ambiguity from a DOA estimate.

FIG. 1 shows a block diagram of an embodiment of an apparatus 100 for resolving an ambiguity from a DOA estimate 105. The DOA estimate 105 may be obtained from the spatial audio signal by using a DOA estimator. Here, the spatial audio signal may comprise an omnidirectional and a plurality of different directional dipole signals. The DOA estimate 105 obtained from the spatial audio signal may correspond to a DirAC parameter and can be represented by an angle $\hat{\varphi}_{amb}$ for a DOA of sound. In particular, the DOA estimate 105 may be dependent on time and on frequency, $\hat{\varphi}_{amb} = \hat{\varphi}_{amb}(k,m)$, wherein k indicates a temporal block and m a frequency band. In addition, the DOA estimate 105, $\hat{\varphi}_{amb}$, essentially corresponds to an inaccurate or ambiguous DOA estimate originating from one or more active sound sources. Referring to FIG. 1, the apparatus 100 comprises a DOA estimate analyzer 110 and an ambiguity resolver 120. It can be seen in FIG. 1 that the DOA estimate analyzer 110 is configured for analyzing the DOA estimate 105 to obtain a plurality of ambiguous analysis parameters by using a bias information 101. Here, the bias information 101 represents a relation, $\hat{\varphi} \leftrightarrow \varphi$, between a biased, $\hat{\varphi}$, and an unbiased DOA estimate, $\varphi$. It is especially pointed out that the DOA estimates may represent biased or unbiased DOA estimates. Moreover, the ambiguity resolver 120 is configured for resolving the ambiguity in the plurality 115 of ambiguous analysis parameter to obtain a non-ambiguous resolved parameter 125.

Figure 2:
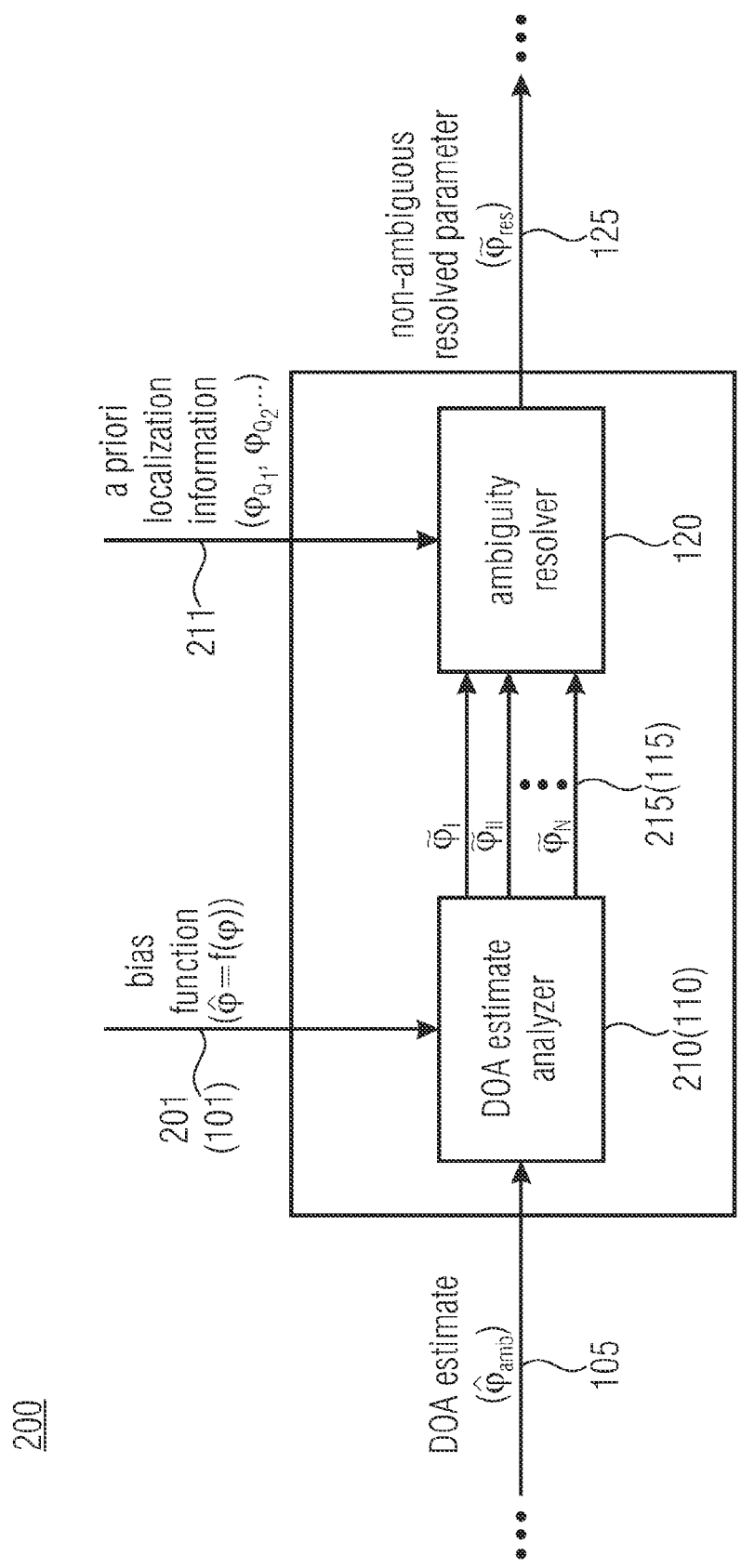
FIG. 2 shows a block diagram of a further embodiment of an apparatus for resolving an ambiguity from a DOA estimate by using a priori localization information.

FIG. 2 shows a block diagram of a further embodiment of an apparatus 200 for resolving an ambiguity from a DOA estimate 105 by using a priori localization or spatial information 211. As shown in FIG. 2, the apparatus 200 comprises a DOA estimate analyzer 210 which is configured to relate the DOA estimate 105, $\hat{\varphi}_{amb}$, to a plurality 215 of ambiguous unbiased DOA estimates, $\tilde{\varphi}_1 \ldots \tilde{\varphi}_N$, based on a bias function 201, $\hat{\varphi} = f(\varphi)$. The DOA estimate analyzer 210 of the apparatus 200 shown in FIG. 2 may correspond to the DOA estimate analyzer 110 of the apparatus 100 shown in FIG. 1. Here, the bias function 201 used by the DOA estimate analyzer 210 in FIG. 2 may be indicated by the bias information 101 in FIG. 1, while the plurality 215 of ambiguous unbiased DOA estimates, $\tilde{\varphi}_1 \ldots \tilde{\varphi}_N$, at the output of the DOA estimate analyzer 210 in FIG. 2 may correspond to the plurality 115 of ambiguous analysis parameters in FIG. 1. In the embodiment of FIG. 2, the ambiguity resolver 120 is configured to determine the non-ambiguous resolved parameter 125, $\tilde{\varphi}_{res}$, from the plurality 215 of ambiguous unbiased DOA estimates, $\tilde{\varphi}_1 \ldots \tilde{\varphi}_N$, by using a priori localization information 211 of one or more active sources. Here, the a priori localization information may represent DOAs 211, $\varphi_{Q_1}, \varphi_{Q_2}, \ldots$ of the one or more active sources. Furthermore, it is to be noted that the DOA estimate 105, $\hat{\phi}_{amb}$, obtained from the DOA estimation may originate from the one or more active sources.

It is also pointed out here that in general, we have two types of DOAs. In embodiments, the DOA's $\phi_{Q_1}$, $\phi_{Q_2}$, ... may correspond to individual source positions, while the DOA estimates $\tilde{\phi}_1 \ldots \tilde{\phi}_N$ may correspond to "instantaneous" DOAs (i.e., DOAs related to individual time/frequency tiles).

Figure 3:
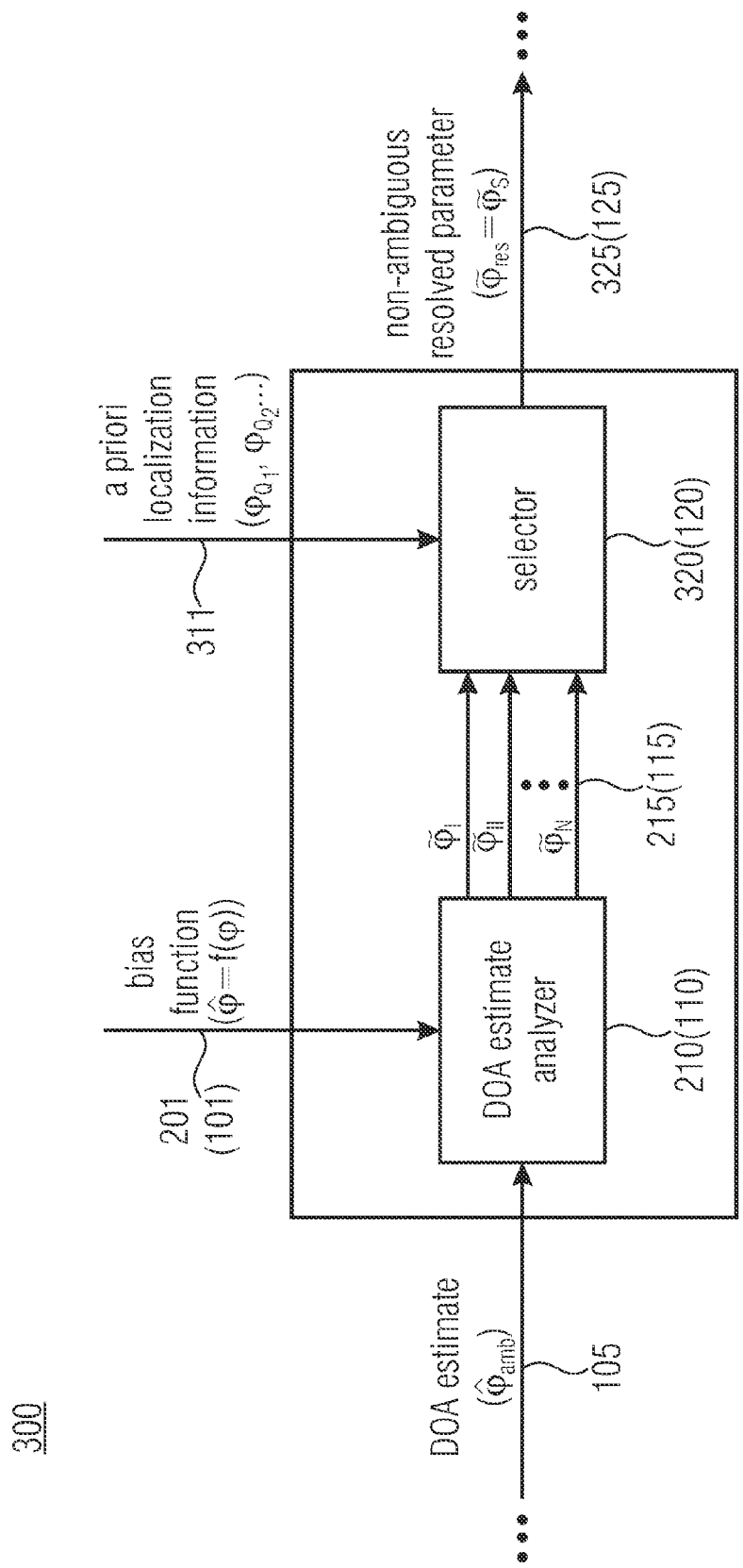
FIG. 3 shows a block diagram of a further embodiment of an apparatus for resolving an ambiguity from a DOA estimate with a selector for selecting a non-ambiguous resolved parameter.

FIG. 3 shows a block diagram of a further embodiment of an apparatus 300 for resolving an ambiguity from a DOA estimate 105 with a selector 320. Here, the apparatus 300 of FIG. 3 essentially comprises the same blocks as the apparatus 200 of FIG. 2. Therefore, identical blocks having similar implementations and/or functions are denoted by the same numerals. However, in the embodiment of FIG. 3, the ambiguity resolver 120 is configured as a selector 320 for selecting a non-ambiguous resolved parameter 325, $\tilde{\phi}_{res}$, from a plurality 215 of ambiguous unbiased DOA estimates. In embodiments, the selector 320 may be configured to perform the selection of the non-ambiguous resolved parameter 325, $\tilde{\phi}_{res}$, based on a measure of a distance between a localization estimate corresponding to an ambiguous unbiased DOA estimate of the plurality 215 of ambiguous unbiased DOA estimates and a priori localization estimates 311 of one or more active sources. Here, the non-ambiguous resolved parameter 325 at the output of the selector 320 shown in FIG. 3 may correspond to the non-ambiguous resolved parameter 125 at the output of the ambiguity resolver 120 shown in FIG. 2. The a priori localization estimates 311 shown in FIG. 3 may correspond to any one of the DOAs $\phi_{Q_1}$, $\phi_{Q_2}$, ... of the one or more active sources. Therefore, in embodiments, the non-ambiguous resolved parameter 325, $\tilde{\phi}_{res}$, may correspond to a selected DOA estimate, $\tilde{\phi}_s$, selected from the plurality 215 of ambiguous unbiased DOA estimates for which the measure of the distance with regard to the one or more active sources is smallest.

Figure 4:
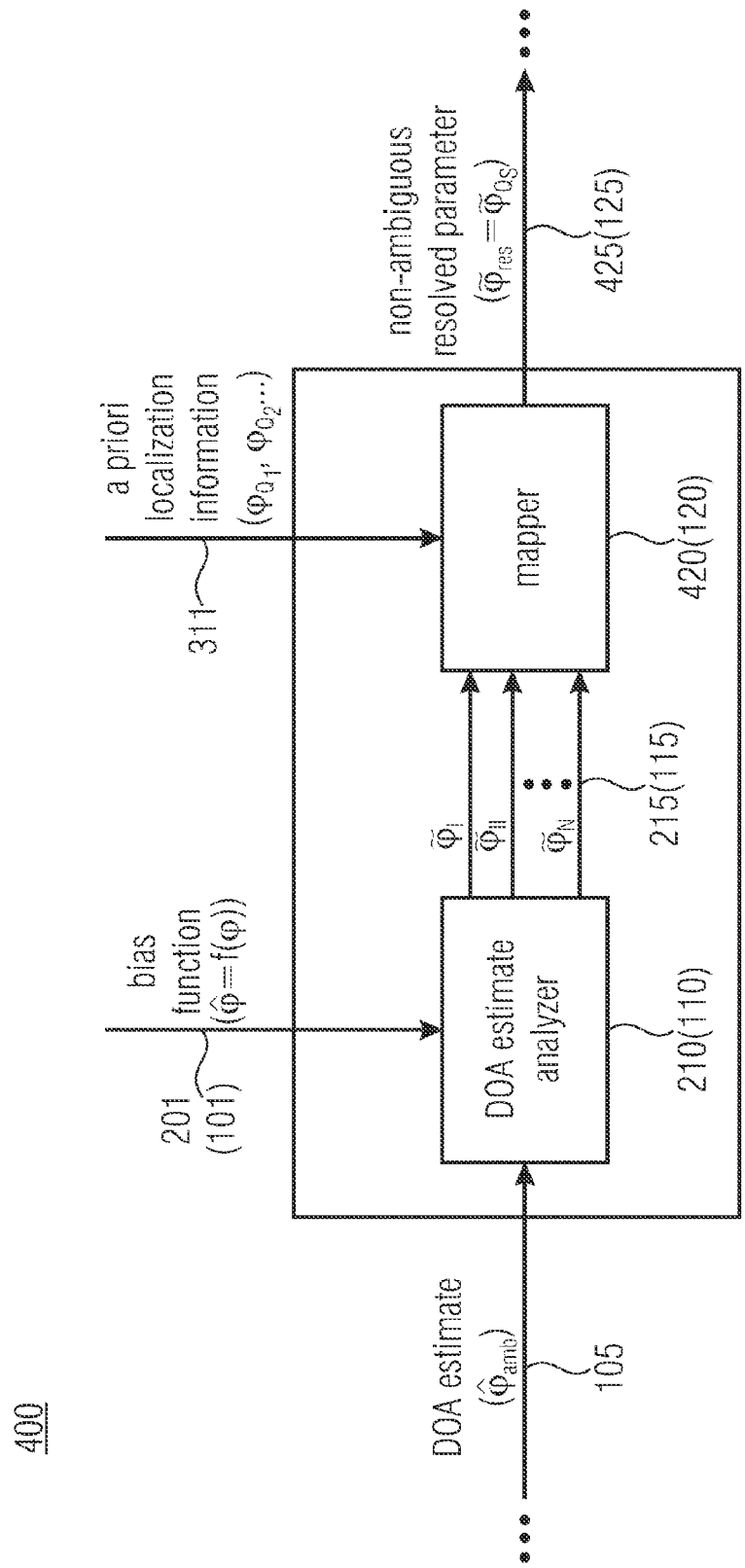
FIG. 4 shows a block diagram of a further embodiment of an apparatus for resolving an ambiguity from a DOA estimate with a mapper for mapping a plurality of ambiguous unbiased DOA estimates to a non-ambiguous resolved parameter.

FIG. 4 shows a block diagram of a further embodiment of an apparatus 400 for resolving an ambiguity from a DOA estimate 105 with a mapper 420. Because the apparatus 400 of FIG. 4 essentially comprises the same blocks as the apparatus 200 of FIG. 2, identical blocks having similar implementations and/or functions are again denoted by the same numerals. In the embodiment of FIG. 4, the ambiguity resolver 120 is configured as a mapper 420 for mapping the plurality 215 of ambiguous unbiased DOA estimates to the non-ambiguous resolved parameter 425, $\tilde{\phi}_{res}$. In particular, the mapper 420 may be configured to perform the mapping of the plurality 215 of ambiguous unbiased DOA estimates based on a measure of a distance between a localization estimate corresponding to an ambiguous unbiased DOA estimate of the plurality 215 of ambiguous unbiased DOA estimates or a selected localization estimate corresponding to a selected DOA estimate 515, $\tilde{\phi}_s$, selected from the plurality 215 of ambiguous unbiased DOA estimates and a priori localization estimates 311 of one or more active sources. As in the embodiment of FIG. 3, the a priori localization estimates 311 may correspond to any one of the DOAs $\phi_{Q_1}$, $\phi_{Q_2}$, ... of the one or more active sources.

Figure 5:
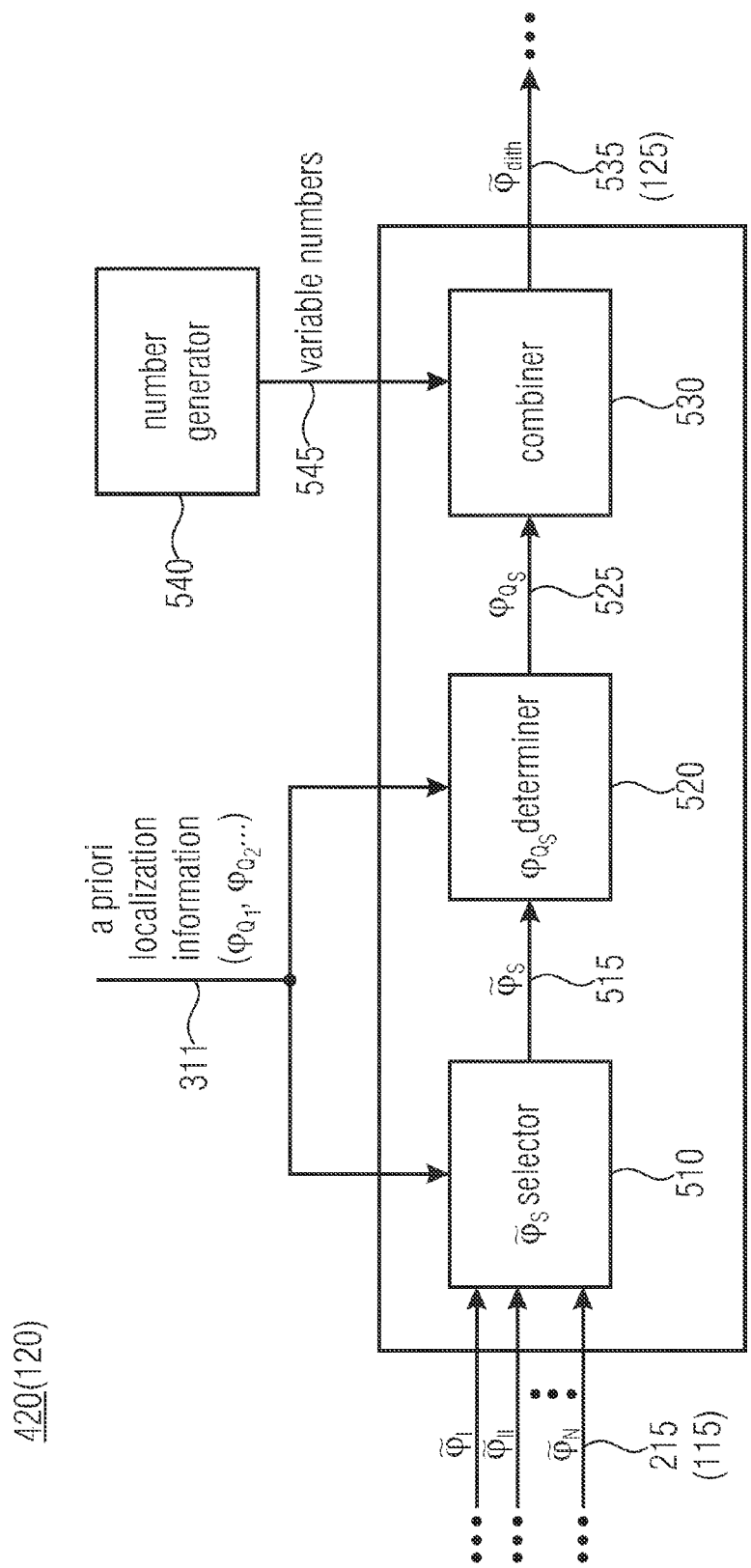
FIG. 5 shows a block diagram of an embodiment of the mapper in accordance with FIG. 4 with a number generator.

FIG. 5 shows a block diagram of an embodiment of the mapper 420 in accordance with FIG. 4 with a number generator 540. In particular, in FIG. 5, more details of the mapper 420 are shown. It can be seen in FIG. 5 that the mapper 420 may comprise a $\tilde{\phi}_s$ selector 510, a $\phi_{Q_s}$ determiner 520 and a combiner 530. The $\tilde{\phi}_s$ selector 510 may be configured to select an unbiased DOA estimate 515, $\tilde{\phi}_s$, from the plurality 215 of ambiguous unbiased DOA estimates for which the measure of the distance with regard to the one or more active sources is smallest. The $\phi_{Q_s}$ determiner 520 may be configured to determine a DOA 525, $\phi_{Q_s}$, of the one or more active sources for which the measure of the distance with regard to the selected unbiased DOA estimate 515, $\tilde{\phi}_s$, is smallest. Here, the non-ambiguous resolved parameter $\tilde{\phi}_{res}$ may correspond to the determined DOA 525, $\phi_{Q_s}$, of the one or more active sources.

The number generator 540 of the mapper 420 shown in FIG. 5 may be implemented for generating variable numbers 545 over time, while the combiner 530 of the mapper 420 shown in FIG. 5 may be implemented for combining a number of the variable numbers 545 provided by the number generator 540 and a determined a priori localization estimate corresponding to a determined DOA 525, $\phi_{Q_s}$, of the one or more active sources to obtain a modified DOA related value 535, $\tilde{\phi}_{dith}$. Here, the non-ambiguous resolved parameter 125, $\tilde{\phi}_{res}$, may correspond to the modified DOA related value 535, $\tilde{\phi}_{dith}$. The number generator 540, which is used for generating the variable numbers 545 over time, may for example, be implemented as a pseudo random number generator such as a linear feedback shift register.

Figure 6:
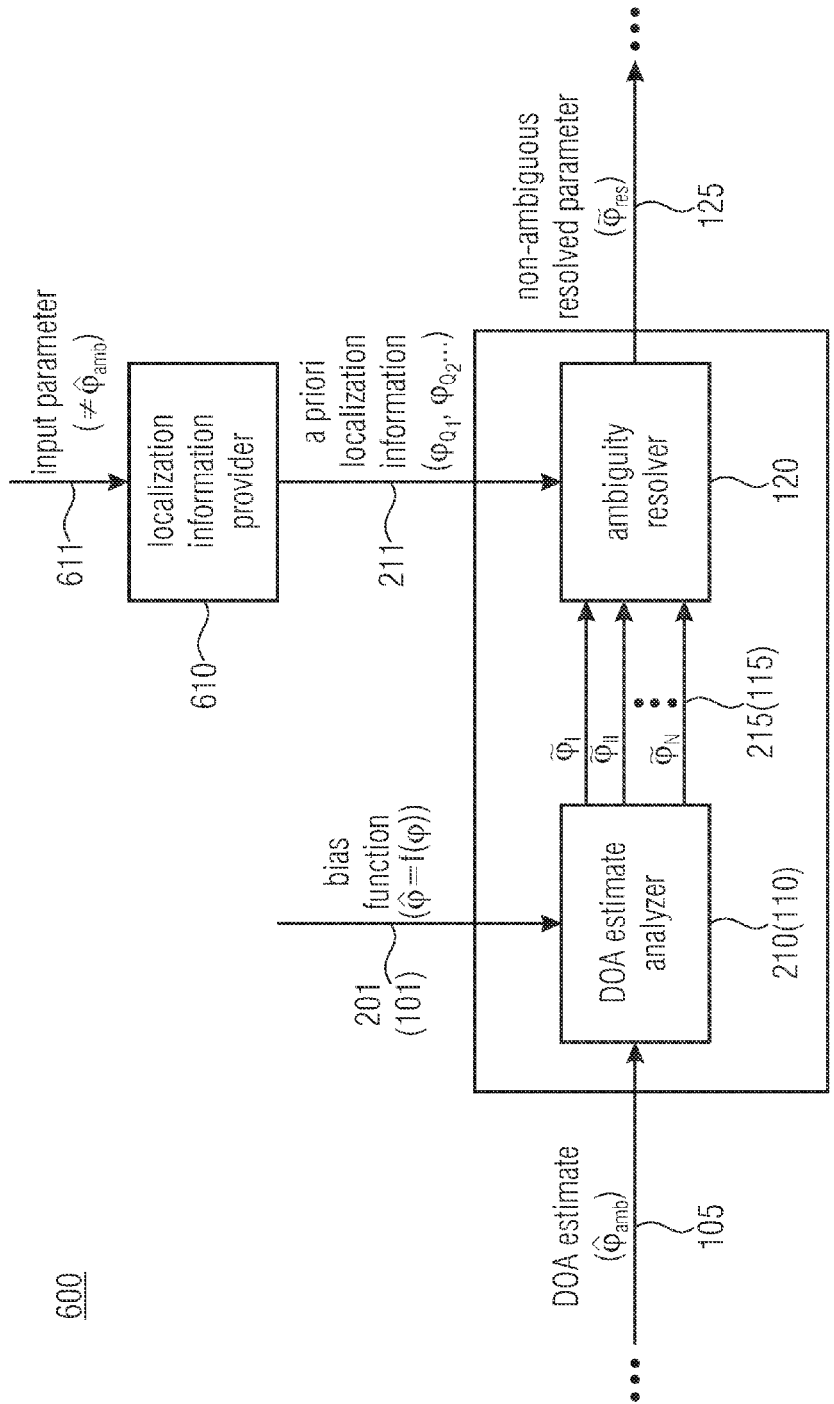
FIG. 6 shows a block diagram of a further embodiment of an apparatus for resolving an ambiguity from a DOA estimate with a localization information provider for providing a priori localization information.

FIG. 6 shows a block diagram of a further embodiment of an apparatus 600 for resolving an ambiguity from a DOA estimate 105 with a localization or spatial information provider 610. Here, the apparatus 600 of FIG. 6 essentially comprises the same blocks as the apparatus 200 of FIG. 2. Therefore, identical blocks having similar implementations and/or functions are denoted by the same numerals. As shown in FIG. 6, the localization information provider 610 may be configured for providing a priori localization information 211 for one or more active sources. It is shown in the embodiment of FIG. 6 that the localization information provider 610 may be configured to provide the a priori localization information 211 based on an input parameter 611 which is different from the DOA estimate 105, $\hat{\phi}_{amb}$. This means that the a priori localization information 211, such as in the form of DOAs $\phi_{Q_1}$, $\phi_{Q_2}$, ... of one or more active sources, is essentially derived from different data than the DOA estimate 105, $\hat{\phi}_{amb}$.

Figure 7:
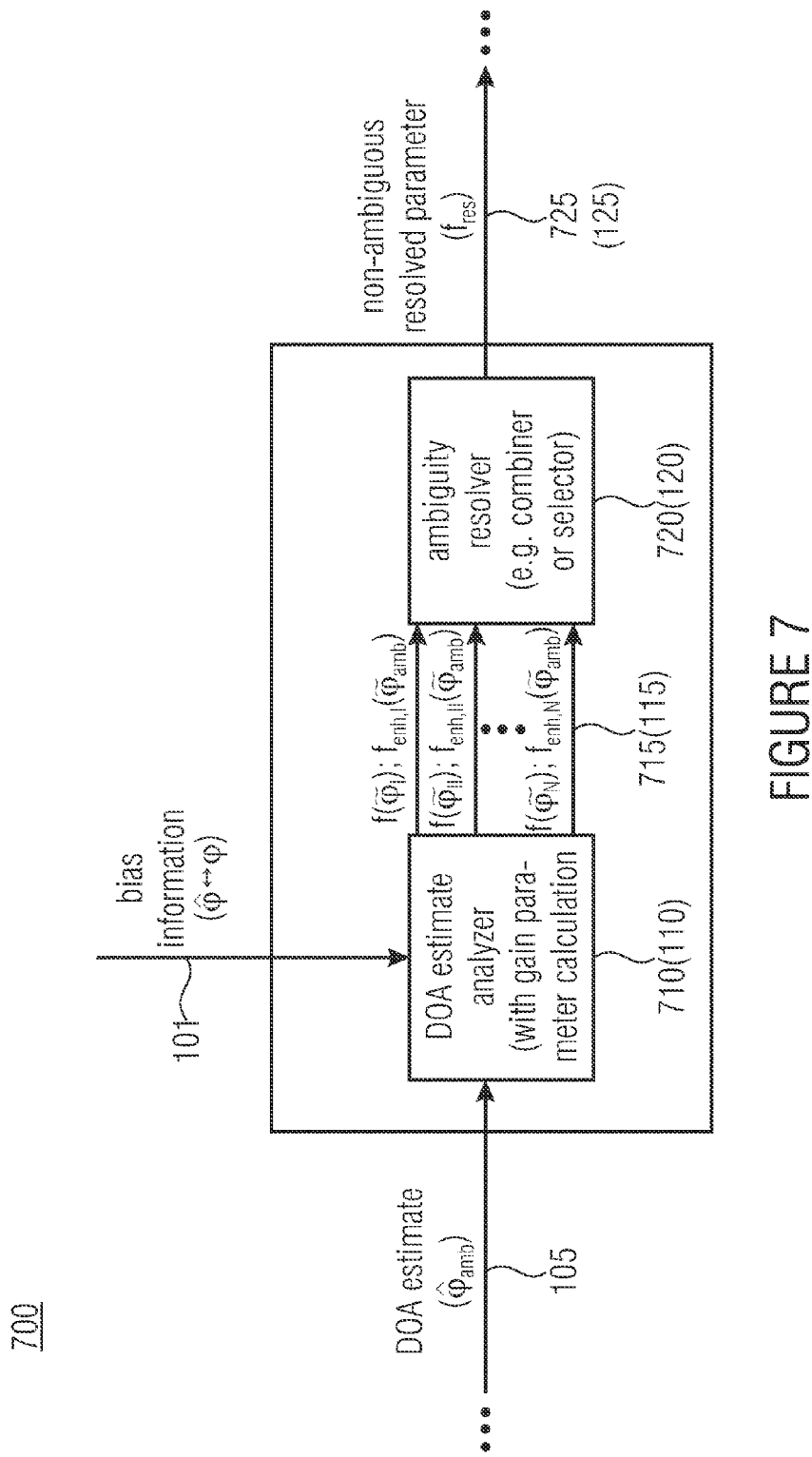
FIG. 7 shows a block diagram of a further embodiment of an apparatus for resolving an ambiguity from a DOA estimate with a gain parameter calculation.

FIG. 7 shows a block diagram of a further embodiment of an apparatus 700 for resolving an ambiguity from a DOA estimate 105 with a gain parameter calculation. As can be seen in FIG. 7, the apparatus 700 comprises a DOA estimate analyzer 710 which may be configured to generate a plurality of branches 715 for each ambiguous analysis parameter of the plurality 115 of ambiguous analysis parameters, wherein the plurality of branches 715 reflects the ambiguity in the plurality 115 of ambiguous analysis parameters. In the embodiment of FIG. 7, the DOA estimate analyzer 710 may be configured to directly obtain the plurality of branches 715 from the DOA estimate 105 or to further process a plurality 813 of ambiguous unbiased DOA estimates to obtain the plurality of branches 715. In particular, the DOA estimate analyzer 710 is configured to calculate gain parameters for a spectral weighting operation such as a rendering or directional filtering operation in the context of directional audio coding. As depicted in FIG. 7, the DOA estimate analyzer 710, including the gain parameter calculation, may receive a bias information 101 so as to generate the plurality of branches 715 by considering an ambiguity from the DOA estimate 105. It is also shown in FIG. 7 that the ambiguity resolver 720 of the apparatus 700 may be configured to determine a non-ambiguous resolved parameter 725, $f_{res}$, from the plurality of branches 715 representing the ambiguous analysis parameters 115.

According to further embodiments, the ambiguity resolver 720 of the apparatus 700 may be configured as a combiner for combining the plurality of ambiguous analysis parameters represented by the plurality of branches 715 to obtain a combined parameter representing the non-ambiguous resolved parameter 725, $f_{res}$.

According to further embodiments, the ambiguity resolver 720 of the apparatus 700 may also be configured as a selector for selecting the non-ambiguous resolved parameter 725, $f_{res}$, from the plurality 115 of ambiguous analysis parameters represented by the plurality 715 of branches.

In particular, the DOA estimate analyzer 710 for performing the gain parameter calculation and the ambiguity resolver 720 in the form of a combiner or a selector of the apparatus 700 shown in FIG. 7 may correspond to the DOA estimate analyzer 110 and the ambiguity resolver 120 of the apparatus 100 shown in FIG. 1, respectively.

Basically, the apparatus 700 of FIG. 7 can especially be used to specify a non-ambiguous resolved parameter from the plurality of ambiguous analysis parameters without necessitating to be operative on a priori localization information. In the embodiment of FIG. 7, the ambiguity resolver 720 which is configured as a combiner or a selector may, for example, be implemented to select a minimum or maximum value of the gain parameters or to combine the gain parameters by calculating a mean value.

Figure 8:
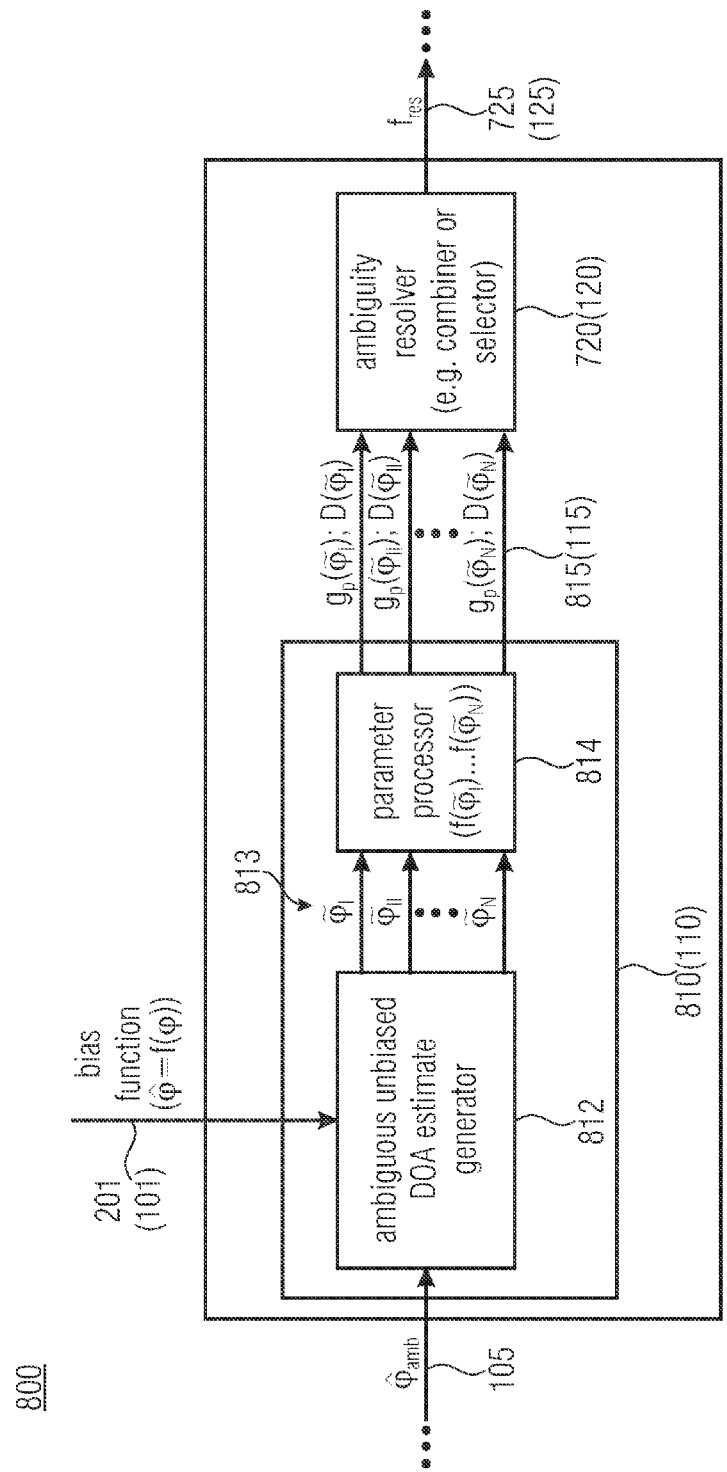
FIG. 8 shows a block diagram of a further embodiment of an apparatus for resolving an ambiguity from a DOA estimate including an ambiguous unbiased DOA estimate generator and a parameter processor.

FIG. 8 shows a block diagram of a further embodiment of an apparatus 800 for resolving an ambiguity from a DOA estimate 105 including an ambiguous unbiased DOA estimate generator 812 and a parameter processor 814. Here, the apparatus 800 of FIG. 8 essentially corresponds to the apparatus 700 of FIG. 7, wherein identical blocks having similar implementations and/or functions are denoted by the same numerals. As shown in FIG. 8, the DOA estimate analyzer 810 of the apparatus 800 may comprise an ambiguous unbiased DOA estimate generator 812 and a parameter processor 814. Here, the ambiguous unbiased DOA estimate generator 812 may be implemented to relate the DOA estimate 105 to a plurality 813 of ambiguous unbiased DOA estimates based on a biased function 201, wherein the bias function 201 is indicated by the bias information 101. Moreover, the parameter processor 814 may be implemented to further process the plurality 813 of ambiguous unbiased DOA estimates to obtain the plurality 815 of branches representing the ambiguous analysis parameters 115. According to embodiments, the plurality 815 of branches representing the ambiguous analysis parameters 115 may correspond to a set of gain parameters ($g_p$) to be used for a rendering operation, such as three-way panning gain parameters, or a gain parameter (D) that can be applied for directional filtering within a DirAC coding scheme, respectively. In embodiments, corresponding gain parameters $g_p$ for the rendering operation or the gain parameters D for the directional filtering operation of the different branches 815 may, for example, be linearly combined such as to obtain their mean value, or a specific gain parameter (e.g. a minimum or maximum value) may be selected by the use of the ambiguity resolver 720. At the output of the ambiguity resolver 720, the non-ambiguous resolved parameter 725, $f_{res}$, will be obtained.

Figure 9:
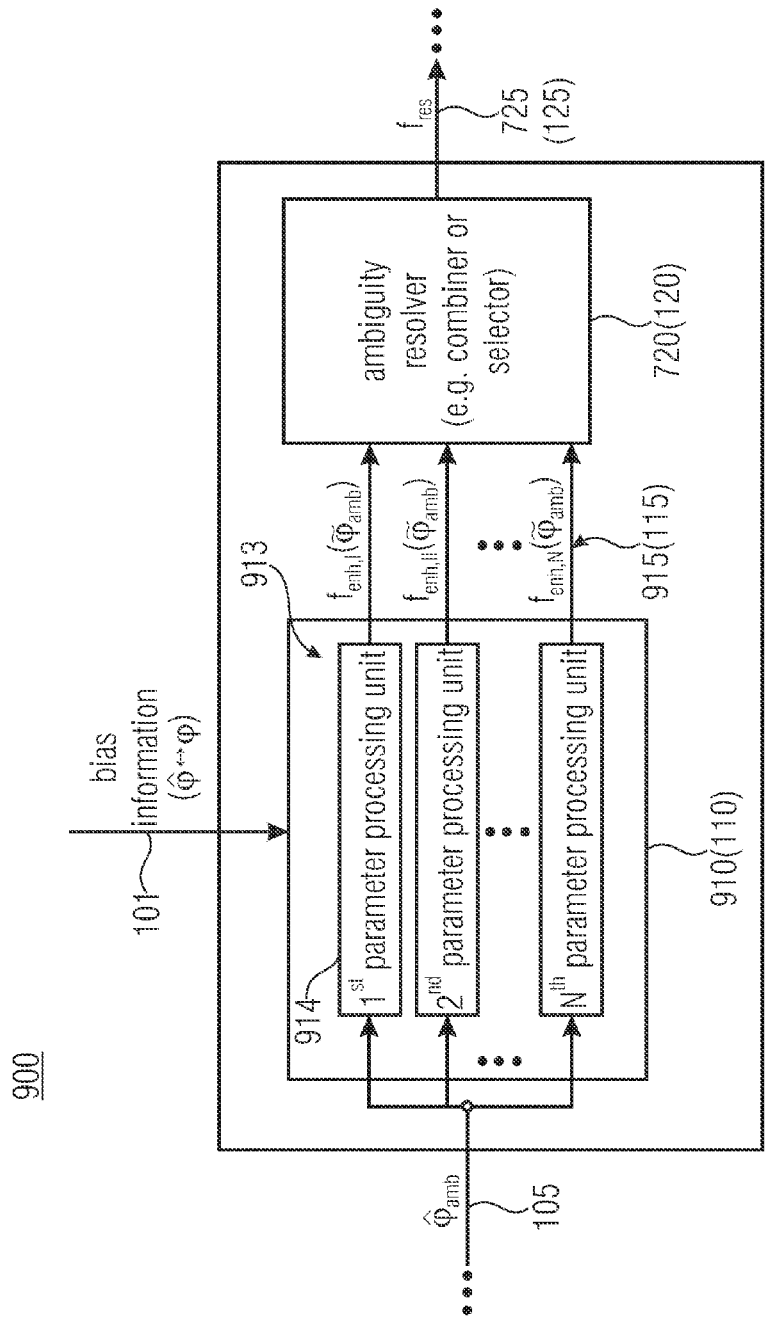
FIG. 9 shows a block diagram of a further embodiment of an apparatus for resolving an ambiguity from a DOA estimate with a plurality of parameter processing units for obtaining a processing result in a single step.

FIG. 9 shows a block diagram of a further embodiment of an apparatus 900 for resolving an ambiguity from a DOA estimate 105 with a plurality 913 of parameter processing units. Here, the apparatus 900 of FIG. 9 may correspond to the apparatus 700 of FIG. 7, wherein identical blocks having similar implementations and/or functions are denoted by the same numerals. Specifically, in the embodiment of FIG. 9, the apparatus 900 comprises a DOA estimate analyzer 910 which may be configured for obtaining a plurality 915 of branches in a single processing step such that a processing result representing the ambiguous analysis parameters 115 will be provided, which would be obtained if two processing steps were performed consecutively.

It is pointed out here that the processing result obtained by the DOA estimate analyzer 910 essentially corresponds to the processing result or plurality 815 of branches obtained by the DOA estimate analyzer 810 shown in FIG. 8. Here, each processed parameter or output parameter obtained by the plurality of parameter processing units 913 is essentially equal to a corresponding gain parameter $g_p$; D output by the parameter processor 814. However, in the embodiment of FIG. 9, these identical parameters can efficiently be obtained by using only a single processing step. The DOA estimate analyzer 910 of the apparatus 900 can therefore also be referred to as an enhanced processor for processing the DOA estimate 105 in an enhanced way so as to obtain the processing result without necessitating an intermediate processing step.

Furthermore, in the embodiment of FIG. 9, the DOA estimate analyzer 910 and the ambiguity resolver 720 may also be configured for obtaining the non-ambiguous resolved parameter 725 in a single processing step such that a processing result representing the non-ambiguous resolved parameter 725 will be provided, which would be obtained if at least two processing steps were performed consecutively.

In embodiments, the non-ambiguous resolved parameter 725 can be predetermined or pre-computed in dependence on a corresponding DOA estimate 105. The thus obtained parameters and corresponding DOA estimates can be inserted into a look-up table. The look-up table including this predetermined information can efficiently be used to avoid or at least reduce the computational effort generated during the actual processing.

In particular, the DOA estimate 105 that is estimated from a spatial audio signal by the use of a DOA estimator can be first addressed as an input value in the look-up table and then the corresponding non-ambiguous resolved parameter 725 that is associated with the input value in the look-up table can be output as an output value.

Alternatively, referring to FIG. 9, the DOA estimate analyzer 910 of the apparatus 900 may comprise, for each branch of the plurality 915 of branches, a parameter processing unit. In particular, each parameter processing unit 914 of the plurality of parameter processing units 913 may be configured to relate the DOA estimate 105 to a corresponding ambiguous analysis parameter. Moreover, the ambiguity resolver 720 of the apparatus 900 can subsequently be used to resolve the ambiguity in the processing result representing the ambiguous analysis parameters 915 to finally obtain the non-ambiguous resolved parameter 725.

Embodiments of the present invention relate to parametric spatial audio coding and some processing units of Directional Audio Coding (DirAC). The DirAC coding scheme is an efficient spatial coding technique, which is based on microphone input and which serves as an exemplary basis for further considerations. The approach of the present invention to cope with inaccurate spatial parameter estimates is presented in some more detail in the following.

The context of the present invention is parametric spatial audio coding. First, some important examples of parametric spatial audio representation are described. We mainly consider the approach DirAC as described in V. Pulkki. Spatial sound reproduction with directional audio coding. *J. Audio Eng. Soc.*, 55(6):503-516, June 2007, as an example for a spatial audio codec, which is based on microphone signals. However, the basic principles of the present invention may also be applied to other spatial audio coding schemes, where ambiguities in spatial parameter estimates in certain spectral regions can, e.g., be resolved by means of parameter estimates from different regions or by considering other additional information sources such as video images. Before looking into the specific details of DirAC, we consider the basic encoder/decoder structures which are common for all parametric spatial coding schemes.

Figure 10:
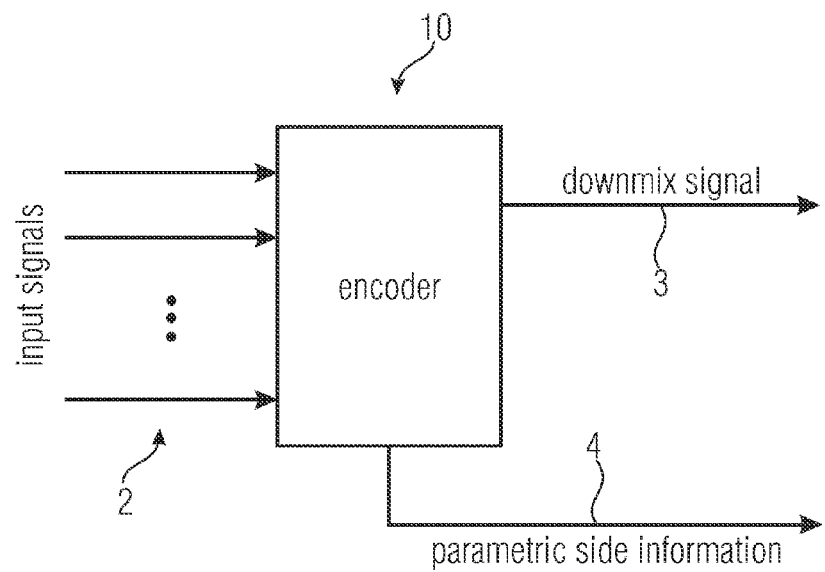
FIG. 10 shows a schematic illustration of a parametric spatial audio encoder.

The general structure of a parametric spatial audio encoder 10 according to embodiments of the present invention is illustrated in FIG. 10. FIG. 10 shows an illustration of a parametric spatial audio encoder. The encoder 10 takes as input multiple audio channels 2, e.g. microphone signals, as described in V. Pulkki. Spatial sound reproduction with directional audio coding. *J. Audio Eng. Soc.*, 55(6):503-516, June 2007, and C. Faller. Microphone front-ends for spatial audio coders. In 125*th AES Convention*, San Francisco, USA, October 2008. The output of the encoder 10 is a downmix signal 3 and corresponding side information 4. The downmix signal 3 consists of one or more audio channels. The side information 4 includes parametric meta data representing the observed sound field. The output of the encoder 10, i.e., the combination of the downmix signal 3 and the side information 4, is called spatial audio stream or spatial audio representation in the following.

Figure 11:
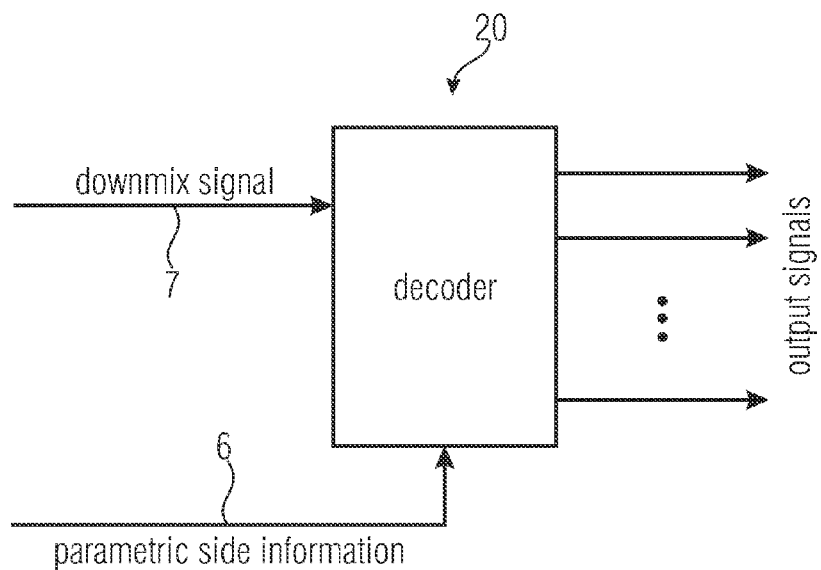
FIG. 11 shows a schematic illustration of a parametric spatial audio decoder.

The general structure of a corresponding parametric spatial audio decoder 20 is illustrated in FIG. 11. FIG. 11 shows an illustration of a parametric spatial audio decoder. The decoder 20 takes the spatial audio stream as input. Based on the downmix signal 7 and the meta data included in the side information 6, the decoder 20 computes loudspeaker or headphones signals corresponding to a desired playback configuration. Typical loudspeaker setups are, e.g., described in ISO/IEC 23003-1:2007. Information technology—MPEG Audio technologies—Part 1: MPEG Surround. International Standards Organization, Geneva, Switzerland, 2007.

Directional audio coding (DirAC) uses a parametric representation of a sound field using the instantaneous direction-of-arrival (DOA) and diffuseness of sound in frequency subbands, i.e., it only takes features into account that are relevant for human hearing. The DirAC approach is based on the assumption that interaural time differences (ITD) and the interaural level differences (ILD) are perceived correctly, if the DOA of a sound field is correctly reproduced. Correspondingly, the interaural coherence (IC) is assumed to be perceived correctly, if the diffuseness of a sound field is reproduced correctly. In this way the reproduction side only needs the direction and diffuseness parameters and a monophonic microphone signal to generate features that are relevant for human perception of spatial audio at a given listening position with an arbitrary set of loudspeakers.

It should be noted that throughout the following we assume that point-like sound sources cause a certain DOA of sound in a broad frequency range. To give an example: a single active talker is expected to cause a certain DOA of sound for the entire speech spectrum. In case that two talkers are active at the same time, we expect that the DOA for each frequency band is determined by the DOA corresponding to the most dominant source which "emits the highest sound energy" in that specific frequency band.

In the following, the DirAC analysis for a parameter estimation in DirAC is described. In DirAC, the desired parameters, i.e., DOA of sound $e_{DOA}(k, m)$ (or, alternatively represented by a corresponding angle $\phi(k, m)$) and the diffuseness $\Psi(k, m)$ in each frequency band m and temporal block index k, can be estimated via an energetic analysis of the sound field, as described in V. Pulkki. Spatial sound reproduction with directional audio coding. *J. Audio Eng. Soc.*, 55(6):503-516, June 2007, based on B-format microphone signals. B-format microphone signals consist of an omnidirectional signal $W(k, m)$, and two dipole signals ($U_x(k, m)$ and $U_y(k, m)$) corresponding to the x-, y-direction of a Cartesian coordinate system. The B-format signals can be directly measured using, e.g., a specific B-format microphone as described in E. Benjamin and T. Chen. The native B-format microphone: Part I. In 119*th AES Convention*, Paper 6621, New York, October 2005, or alternatively using an array of omnidirectional microphones as described in J. Merimaa. Applications of a 3-D microphone array. In 112*th AES Convention*, Paper 5501, Munich, May 2002. For the latter, there is the fundamental assumption that the acoustic signal's wavelength is much larger than the spacing of the omnidirectional microphones. At high frequencies, where this assumption does not hold, there is a systematic bias with regard to the estimation of the DOA. At very low frequencies there is an increasing influence of the microphones' self-noise. Therefore, problems at high frequencies cannot simply be solved by designing very closely spaced arrays. Details about the DOA estimation and the previously described problem at high frequencies are addressed in the following paragraphs.

One basic foundation in spatial audio coding, e.g., in DirAC, is that the DOA is estimated correctly. To perform this task the direction of the active intensity vector in a time/frequency domain representation is investigated:

$$\vec{I}_a(k, m) = \frac{1}{\sqrt{2}\,\rho_0 c} Re\{W(k, m)[U_x(k, m)U_y(k, m)]^H\}. \tag{1}$$

The superscript $^H$ denotes conjugate transposition. $\rho_0$ represents the mean density of air and c is the speed of sound. Finally, the opposite direction of $I_a(k, m)$ points to the DOA of sound:

$$\vec{e}_{DOA}(k, m) = -\frac{\vec{I}_a(k, m)}{\left\|\vec{I}_a(k, m)\right\|} = [\cos\varphi(k, m)\sin\varphi(k, m)]^T, \tag{2}$$

where $\phi(k, m)$ denotes the DOA's azimuth angle. The superscript $^T$ denotes transposition.

The two dipole signals $U_x(k, m)$ and $U_y(k, m)$ may be provided by microphones with figure-of-eight directionality. A cost-saving alternative would be to use first-order differential arrays of omnidirectional microphones as described in G. W. Elko. Superdirectional microphone arrays. In S. L. Gay and J. Benesty, editors, *Acoustic Signal Processing for Telecommunication*, chapter 10, pages 181-235. Kluwer Academic Publishers, 2000. However, with both options there are deviations from the desired figure-of-eight directionality; usually at very low and high frequencies. With high-quality directional microphones this deviation can be much smaller compared to first-order differential arrays. While the deviations in directional microphones have to be described by means of measurements, a bias with the DOA estimation on the basis of arrays can be formulated analytically. Investigations for specific array geometries can be found in M. Kallinger, F. Kuech, R. Schultz-Amling, G. Del Galdo, J. Ahonen, and V. Pulkki. Analysis and Adjustment of Planar Microphone Arrays for Application in Directional Audio Coding. In 124*th AES Convention*, Paper 7374, Amsterdam, the Netherlands, May 2008. As an example, FIG. 13 shows the inaccurate DOA estimate 105 as a function of the actual DOA for an array of five microphones with a spacing of d=4 cm (see FIG. 12). For this example, the bias can be expressed by:

$$E\{\hat{\varphi}\} = \arctan\left(\frac{\sin\left(2\pi f \frac{d}{2c} \sin\varphi\right)}{\sin\left(2\pi f \frac{d}{2c} \cos\varphi\right)}\right). \tag{3}$$

At low frequencies f we may apply the approximation sin x≈x, obtaining hardly biased estimates $E\{\hat{\varphi}\} \approx \varphi$. Close to a certain limit, e.g., at 5 kHz we observe clear deviations from unbiased estimates which can be expressed using equation (3). As can be noticed from FIG. 13, the bias can be removed by inverting the mapping curve 201 up to the so-called aliasing frequency $f_{alias}$. In the considered example, $f_{alias} \approx 6$ kHz. Beyond this limit, i.e., for $f > f_{alias}$, an estimate $\hat{\varphi}_1$ (DOA estimate 105, $\hat{\varphi}_{amb}$) cannot be assigned to a single un-biased DOA $\varphi$ anymore. In this example, there are three candidates 115, $\tilde{\varphi}_I$ to $\tilde{\varphi}_{III}$, of which only one is the correct DOA. According to M. Kallinger, F. Kuech, R. Schultz-Amling, G. Del Galdo, J. Ahonen, and V. Pulkki. Analysis and Adjustment of Planar Microphone Arrays for Application in Directional Audio Coding. In 124*th AES Convention*, Paper 7374, Amsterdam, the Netherlands, May 2008, the upper limit frequency for non-ambiguous DOA estimation is stated by $$f_{alias} = \sqrt{\frac{1}{2}} \frac{c}{d}. \tag{4}$$

We refer to it as DirAC's spatial aliasing frequency. The compensation of the systematic bias below $f_{alias}$ was described in M. Kallinger, F. Kuech, R. Schultz-Amling, G. Del Galdo, J. Ahonen, and V. Pulkki. Analysis and Adjustment of Planar Microphone Arrays for Application in Directional Audio Coding. In 124*th AES Convention*, Paper 7374, Amsterdam, the Netherlands, May 2008. However, the present invention contains approaches to resolve the ambiguity above of $f_{alias}$. Note that resolving the ambiguity implies also any systematic bias correction.

Figure 12:
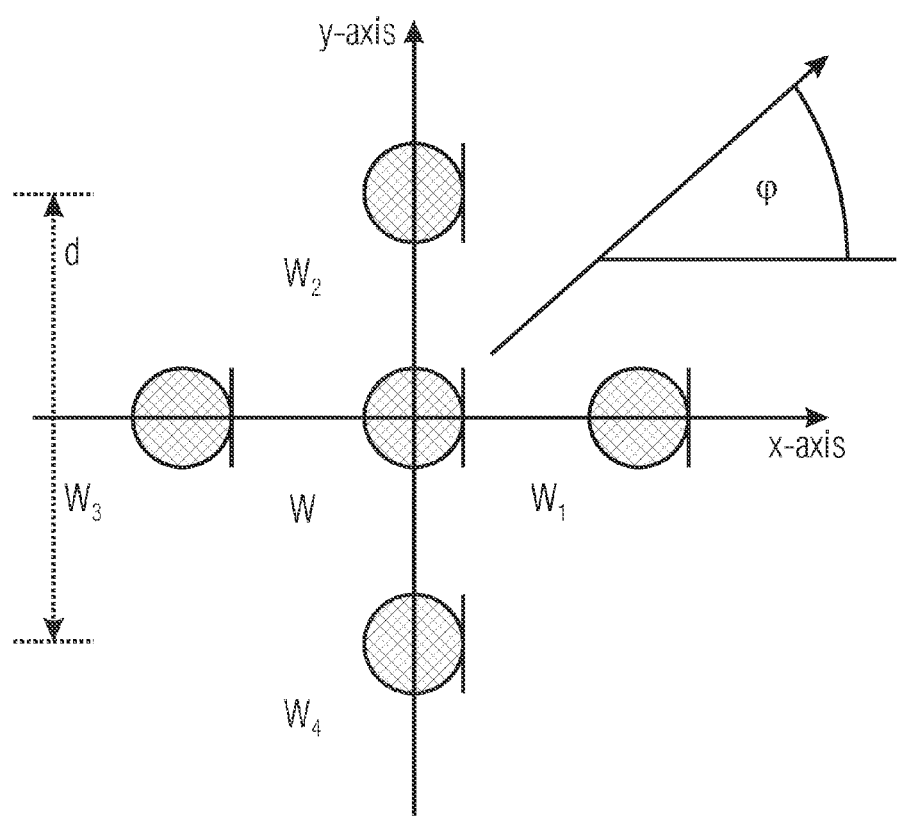
FIG. 12 shows a schematic illustration of a square-shaped array of omnidirectional microphones with a fifth omnidirectional microphone in the center.
Figure 13:
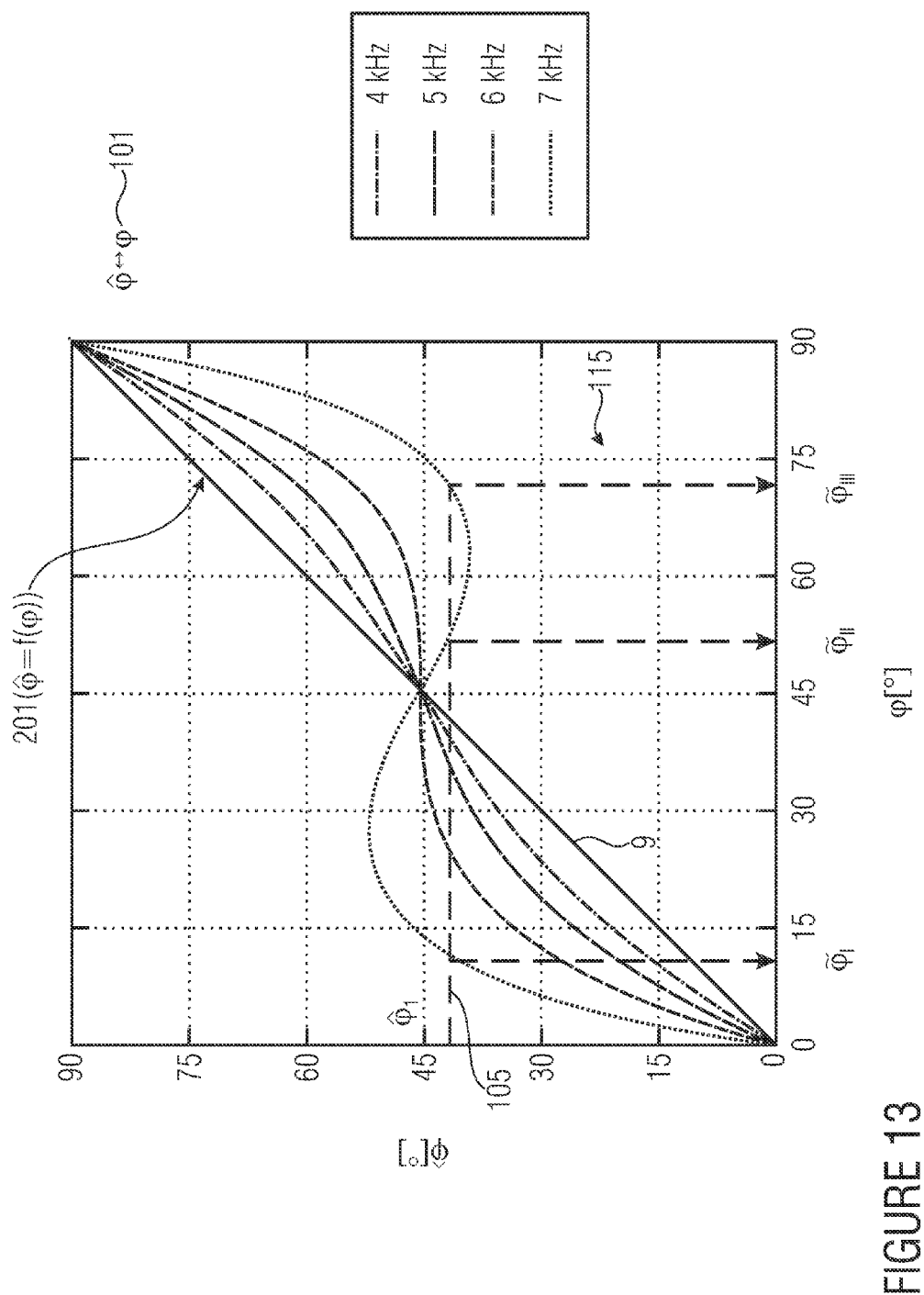
FIG. 13 shows an example graph of Azimuth angle estimates at frequencies between 4 and 7 kHz according to an embodiment of the present invention.

Specifically, FIG. 12 shows a square-shaped array of omnidirectional microphones with a fifth omnidirectional microphone in the center. The spacing of adjacent microphones is d/2. Moreover, FIG. 13 shows an azimuth angle estimates $\hat{\varphi}$ at frequencies between 4 and 7 kHz. The gray line 9 represents an unbiased angle estimation. At 7 kHz we can clearly observe an ambiguity due to spatial aliasing, i.e., one exemplary estimate $\hat{\varphi}_1$ cannot be assigned to a single un-biased estimate. There are three candidates $\tilde{\varphi}_I$ to $\tilde{\varphi}_{III}$, from which the un-biased estimate has to be chosen from.

Next, the spectral weighting as a processing principle for directional filtering and rendering in DirAC is described. After DirAC analysis, i.e., after all DirAC parameters (DOA expressed by $\varphi(k, m)$ and diffuseness of sound $\Psi(k, m)$ accompanied with a downmix signal W(k, m)) have been calculated, we may use these parameters to render loudspeaker signals for an arbitrary arrangement of loudspeaker. Optionally, we may perform directional filtering in DirAC's parameter domain. Both rendering and directional filtering are based on the principle of spectral weighting. They are affected by possibly ambiguous DOA estimates. The basic functionality of each processing unit and, especially, the computation of spectral weighting functions are schematically described in the following two paragraphs.

Referring to the DirAC Synthesis, on the reproduction side, the different loudspeaker signals are computed based on a mono downmix signal together with the DOA and diffuseness parameters of DirAC. The loudspeaker signals are composed of signal components corresponding to direct, i.e., coherent and to diffuse sound, respectively. The diffuse sound component does not depend on the DOA. Consequently, it is not treated here. The coherent portion of the p-th loudspeaker signal $S_p(k, m)$ is computed according to $$S_p(k,m) = g_p(k,m) W(k,m) \tag{5}$$

Figure 14:
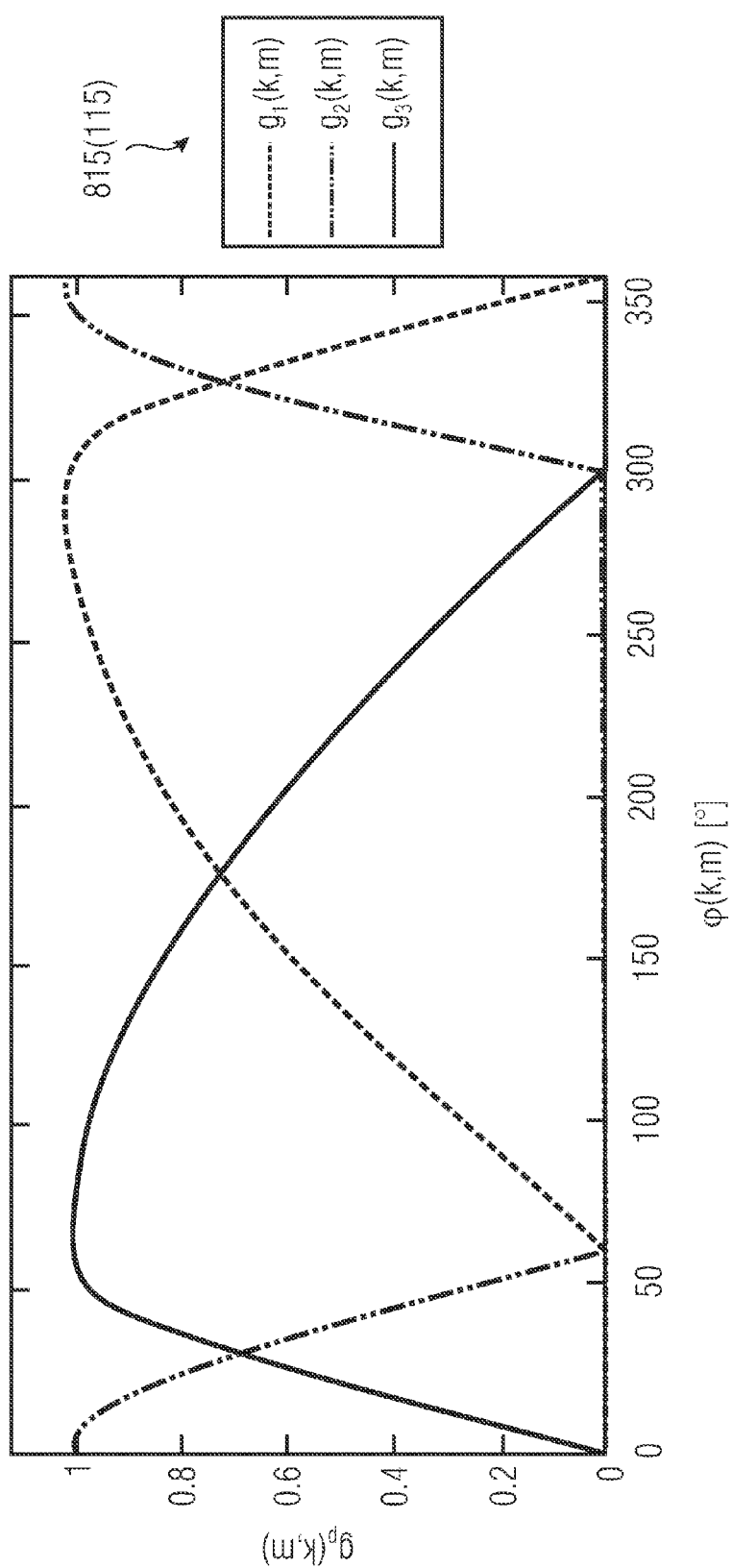
FIG. 14 shows example graphs for panning gains as a function of the DOA for a setup of 3 loudspeakers according to an embodiment of the present invention.

The panning gain $g_p(k, m)$ or gain parameter (815) depends on the DOA of sound $\varphi(k, m)$ or $\hat{\varphi}_{amb}$ (105), the number of loudspeakers, and the position of the p-th loudspeaker relative to a desired listening position. FIG. 14 depicts some exemplary gain functions as a function of the DOA for a setup with three loudspeakers at −60° ($g_1(k, m)$), 0° ($g_2(k, m)$), and 60° ($g_3(k, m)$). In other words, FIG. 14 shows examples for panning gains as a function of the DOA $\varphi(k, m)$ for a setup of three loudspeakers at −60° ($g_1(k, m)$), 0° ($g_2(k, m)$), and 60° ($g_3(k, m)$), respectively. Each gain function determines the assignment of a DOA to a spectral gain. Using corrupted DOAs might result into a distorted spatial image.

Referring to the directional filtering, in the processing chain between DirAC analysis and synthesis there is the option to apply additional processing steps, e.g., to perform spatial filtering. The goal is to preserve sound arriving from certain directions while attenuating sound from other directions. In principle, this technique can be considered as a kind of "beamforming" in the DirAC parameter domain. In M. Kallinger, H. Ochsenfeld, G. Del Galdo, Kuech, D. Mahne, R. Schultz-Amling, and O. Thiergart. A spatial filtering approach for directional audio coding. In 126*th AES Convention*, Paper 7653, Munich, Germany, May 2009, there is a proposal for such a technique called directional filtering: basically, directional filtering applies a gain function to the downmix signal W (k, m) in a time/frequency representation to obtain an output signal spectrum.

$$W_{df}(k,m) = D(k,m) W(k,m) \tag{6}$$

The subscript $_{df}$ denotes "directionally filtered". The gain function D(k, m) or gain parameter (815) is designed as a function of the DOA or $\hat{\varphi}_{amb}$ (105) and the diffuseness. The design principle can be explained by means of FIG. 15.

Specifically, FIG. 15 shows a directional pattern of directional filtering gain functions. The design of the gain function can be carried out by the assignment of an instantaneous DOA $\varphi(k, m)$ (azimuth in the polar plot) to the corresponding gain (radius in the polar plot). The directivity is broadened, if the diffuseness increases. A desired source is assumed to be located at 30°, where the gain function equals one.

The polar plot represents the design function for the time- and frequency-dependent gain D(k, m) as a function of the DOA, $\varphi(k, m)$, at each temporal block k and frequency bin m. The design function is broadened, if the diffuseness $\Psi(k, m)$ increases. Note that the design function itself according to M. Kallinger, H. Ochsenfeld, G. Del Galdo, F. Kuech, D. Mahne, R. Schultz-Amling, and O. Thiergart. A spatial filtering approach for directional audio coding. In 126*th AES Convention*, Paper 7653, Munich, Germany, May 2009 is frequency-invariant.

Next, a source localization technique is described. For directional filtering and embodiments of the present invention it is essential to know the number and location of desired sources. In a two-dimensional perspective with a compact microphone arrangement the location information may be represented by the azimuth angle. Thiergart et al. (O. Thiergart, R. Schultz-Amling, G. Del Galdo, D. Mahne, and F. Kuech. Localization of sound sources in reverberant environments based on directional audio coding parameters. In 128th AES Convention, Paper 7853, New York City, N.Y., USA, October 2009) proposed a robust method for counting and locating acoustic sources by means of DirAC parameters. The principle is based on the assumption that each instantaneous DOA, i.e. time- and frequency-dependent DOA, represents the possible direction of an actual source plus an uncertainty, which originates from a certain variance of the estimates. The DOA is treated as a random variable. By means of averaging and clustering operations we can reduce the variance and obtain knowledge about an active source's position, respectively.

The method is based on a histogram of DOAs weighted by the downmix signal's power spectral density (PSD) and calculated only at time/frequency tiles with a low diffuseness. In fact, a low diffuseness parameter can be interpreted as a reliability measure for the DOA. The technique relies on the sparseness of speech signals in a time/frequency representation. Furthermore, Thiergart's approach can also supply statistical information about the parameters, which are used for localization. The DOA's variance, e.g., can be of interest in the embodiment of FIG. 5 as described previously.

It should be noted that in embodiments, different source localization techniques may be operated in connection with DirAC and directional filtering, as well. There exist a large variety of source localization methods, which may also consider different cues than acoustic ones, such as face or body localization based on image or video input data.

Embodiments of the present invention represent an efficient method to resolve a non-uniqueness, which occurs with the estimation of spatial parameters of spatial audio coding techniques. In some parameter estimators, like the DOA estimator of DirAC, the ambiguity is connected with a bias. In cases like this, resolving an ambiguity implicitly invokes a bias compensation, as described in the previous embodiments.

Figure 16:
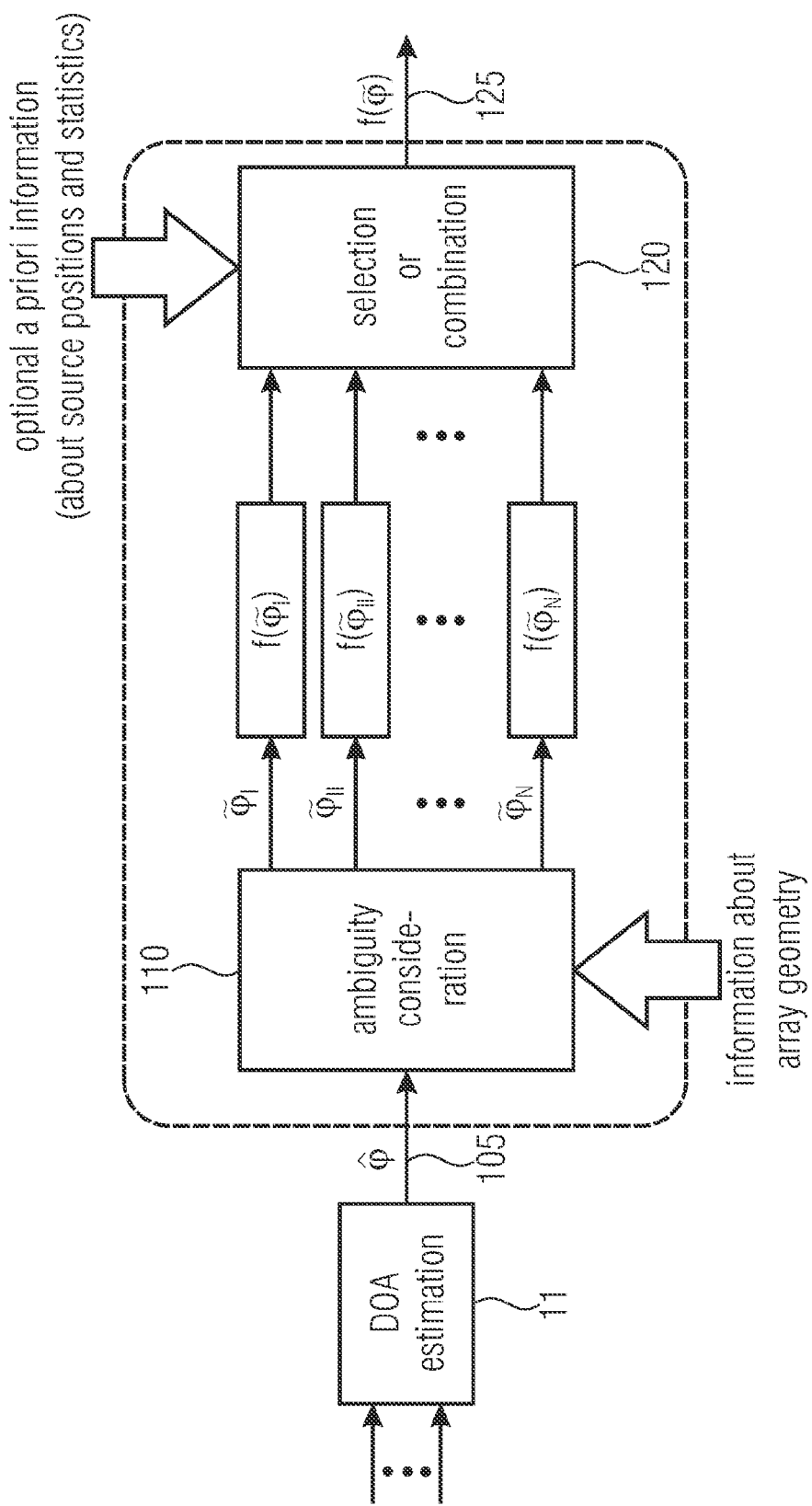
FIG. 16 shows an overall structure of an embodiment of an apparatus to resolve an ambiguity of spatial parameter estimates.

Furthermore, the conceptual structure of the inventive approach is depicted in FIG. 16. A DOA parameter estimate, e.g. denoted by the azimuth angle estimate 105, $\hat{\phi}$, is analyzed with regard to ambiguities. This can be carried out on the basis of measurements or information about the array geometry. An example for the latter is given by the relation according to Eq. (3). As a result we obtain a multitude of candidates for the desired DOA, $\tilde{\phi}_I$ to $\tilde{\phi}_N$. Usually, the current DOA estimate serves as an input parameter for subsequent processing steps. The function f(•) represents such a unit in a general fashion. Since we did not decide on the proper DOA candidate yet, we may consider N processing units in parallel. Finally, we may combine the output parameters $f(\tilde{\phi}_I)$ to $f(\tilde{\phi}_N)$ in an appropriate way, i.e., we may choose only one of the output parameters or compute a suitable combination of them. If applicable, we can additionally introduce a priori information into the "selection or combination" step to improve the ambiguity resolution. This information can, e.g. be knowledge of potential positions of sound sources.

Specifically, FIG. 16 shows an overall structure of the invention to resolve an ambiguity of spatial parameter estimates $\tilde{\phi}_I$ to $\tilde{\phi}_N$. The resolution can be carried out either by selecting the most suitable candidate or by combining subsequent parameters $f(\tilde{\phi}_I)$ to $f(\tilde{\phi}_N)$. If available, a priori information comes into operation to support the selection.

If we consider more concrete realizations of the conceptual structure of FIG. 16 we can derive two strategies according to embodiments of the present invention. In one embodiment, we can set $f(\tilde{\phi}_i)=\tilde{\phi}_i$, i.e. we aim at correcting the DOA parameters regardless of any subsequent processing. Accordingly, we may select the appropriate DOA in the successive stage. Here, combining a multitude of DOAs, e.g., taking the mean, is unlikely to lead to a desired result. A selection of the proper DOA is based on a priori information about the position of a source. In fact, we may choose the DOA from the multitude of DOAs, which has the smallest distance to an active source's position. A more concrete description of this procedure was presented in the embodiments of FIGS. 2 to 4.

The second strategy is based on the fact that the DOA is usually analyzed to serve as an input parameter for subsequent processing units. As described before, such units often generate spectral gain parameters as their output. Being driven by ambiguous DOAs, we obtain a multitude of output parameters. In FIG. 16 these parameters are depicted by $f(\tilde{\phi}_I)$ to $f(\tilde{\phi}_N)$. In contrast to the DOAs themselves, depending on the application, it has been realized that it is possible to combine the output parameters, e.g., to take the maximum, the minimum, the mean, etc. The advantage of this procedure consists of the fact that we do not need to acquire a priori information. This strategy forms another embodiment, which was explained in more detail in FIGS. 7 to 9.

Figure 17:
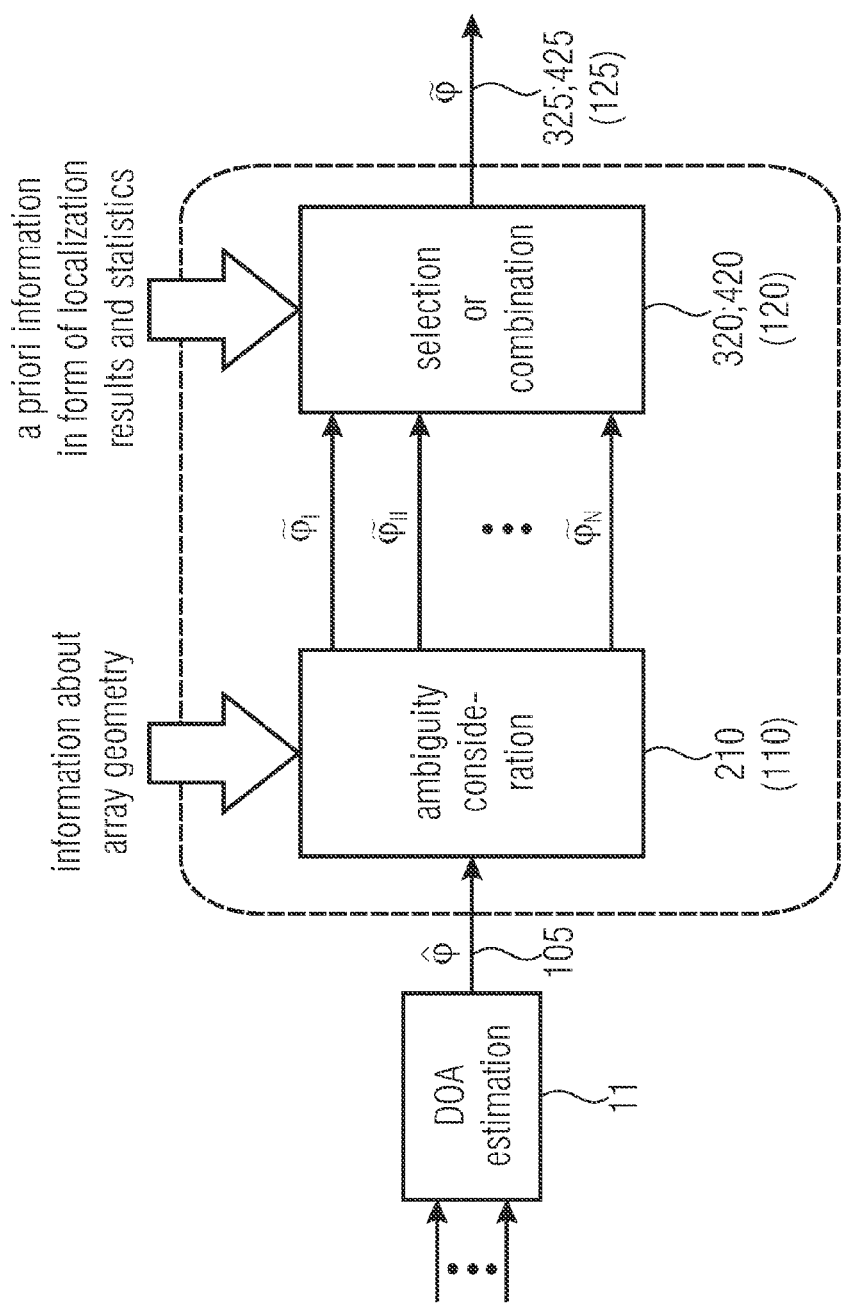
FIG. 17 shows a structure for correcting biased DOA estimates according to an embodiment of the present invention.

An overview of the functionality of all procedures, which aim at correcting DOA estimates, is given in FIG. 17. A DOA estimate 105, $\hat{\phi}$ is obtained from a corresponding estimator 11. After ambiguity consideration we obtain a multitude of candidates for the actual corrected DOA, $\tilde{\phi}_I$ to $\tilde{\phi}_N$, beyond the spatial aliasing frequency. The choice of the "proper" candidate is based on the proximity to the physical DOAs of active sources. Here, we have two strategies to determine the final corrected DOA 125, $\tilde{\phi}$. We can either select the one of the candidates $\tilde{\phi}_I$ to $\tilde{\phi}_N$, which has the smallest distance to one of the active source-DOAs (see FIG. 3) or we directly map the "closest candidate" to an active source's DOA. This option was explained in the embodiment of FIG. 4.

Specifically, FIG. 17 shows a structure for correcting biased DOA estimates, if the inversion is complicated by ambiguity of corrected estimates. The selection of the proper candidate from a multitude of corrected estimates is based on localization of active sound sources. Post-processing on the basis of corrected DOAs, $\tilde{\phi}$, is optional.

The embodiment of FIG. 3 refers to selecting one candidate from a multitude of DOAs. Here, we consider the current DOAs of active sound sources. These DOAs are broadband parameters and typically, they do not vary rapidly compared to the instantaneous DOA. To resolve the non-uniqueness of a DOA estimate at a time/frequency tile beyond $f_{alias}$, we assume that the observed/estimated instantaneous DOA at an individual time/frequency tile is caused by a source, whose location is already known by a priori knowledge 311 or by a localization technique.

Figure 18:
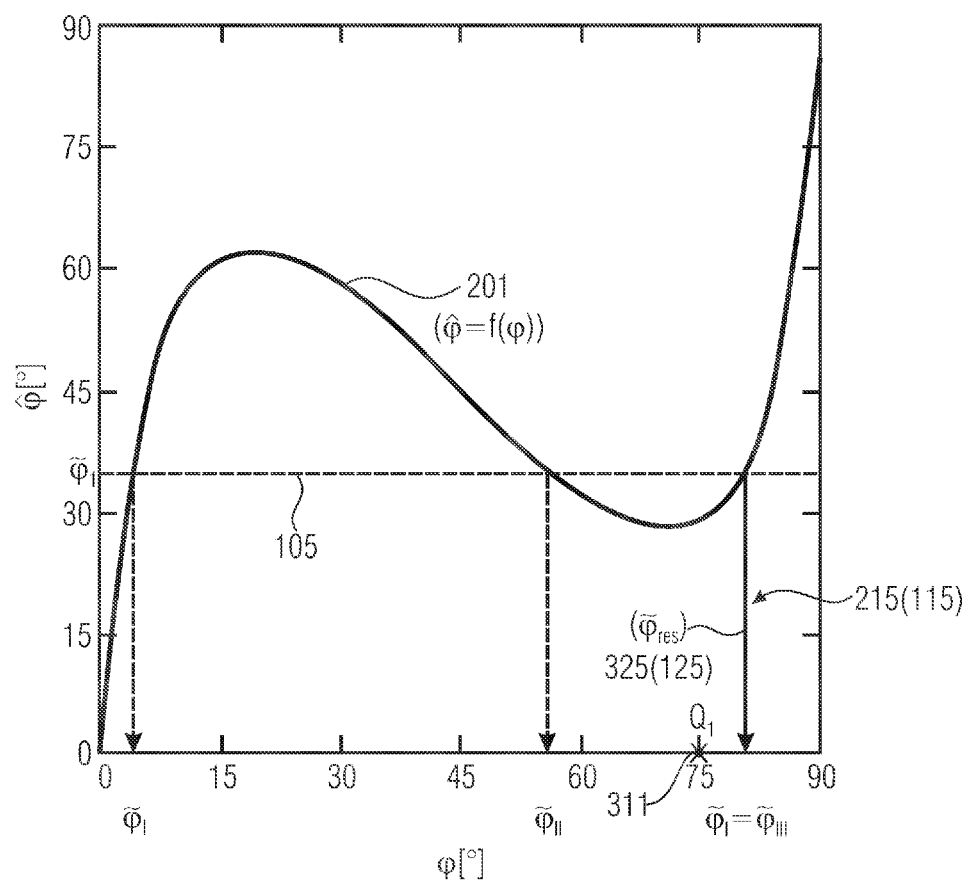
FIG. 18 shows an example graph of an estimated DOA as a function of the unbiased DOA above the spatial aliasing frequency according to an embodiment of the present invention.

An exemplary procedure to correct ambiguous and biased parameter estimates beyond the spatial aliasing frequency is shown in FIG. 18. In FIG. 18, an instantaneous DOA 105 of, e.g. $\hat{\phi}_I$=35° is analyzed. Considering the ambiguity, we obtain three candidates 215, $\tilde{\phi}_I$, $\tilde{\phi}_{II}$, and $\tilde{\phi}_{III}$ for the actual instantaneous DOA. In parallel, a source localization technique has analyzed one active source at $Q_1$=75° (localization estimate 311). From the three candidates in the space of corrected DOAs, $\tilde{\phi}_{III}$ has the shortest Euclidian distance to $Q_1$ in [°]. Therefore, the instantaneous DOA of $\hat{\phi}_I$ can be corrected to $\tilde{\phi}=\tilde{\phi}_{III}$. Note that $\tilde{\phi}$ still can be seen as a random variable.

Specifically, FIG. 18 shows an estimated DOA $\hat{\phi}$ as a function of the unbiased DOA $\phi$ above the spatial aliasing frequency. An instantaneous estimate $\hat{\phi}_I$ is assigned to three corrected, instantaneous DOAs, $\tilde{\phi}_I$ to $\tilde{\phi}_{III}$. A source localization technique has found an active source $Q_1$. Therefore, we assign the one of the three candidates $\tilde{\phi}_I$ to $\tilde{\phi}_{III}$ to the corrected, instantaneous DOA $\tilde{\phi}_I$, which has the smallest distance to $Q_1$: $\tilde{\phi}_I = \tilde{\phi}_{III}$.

Figure 19:
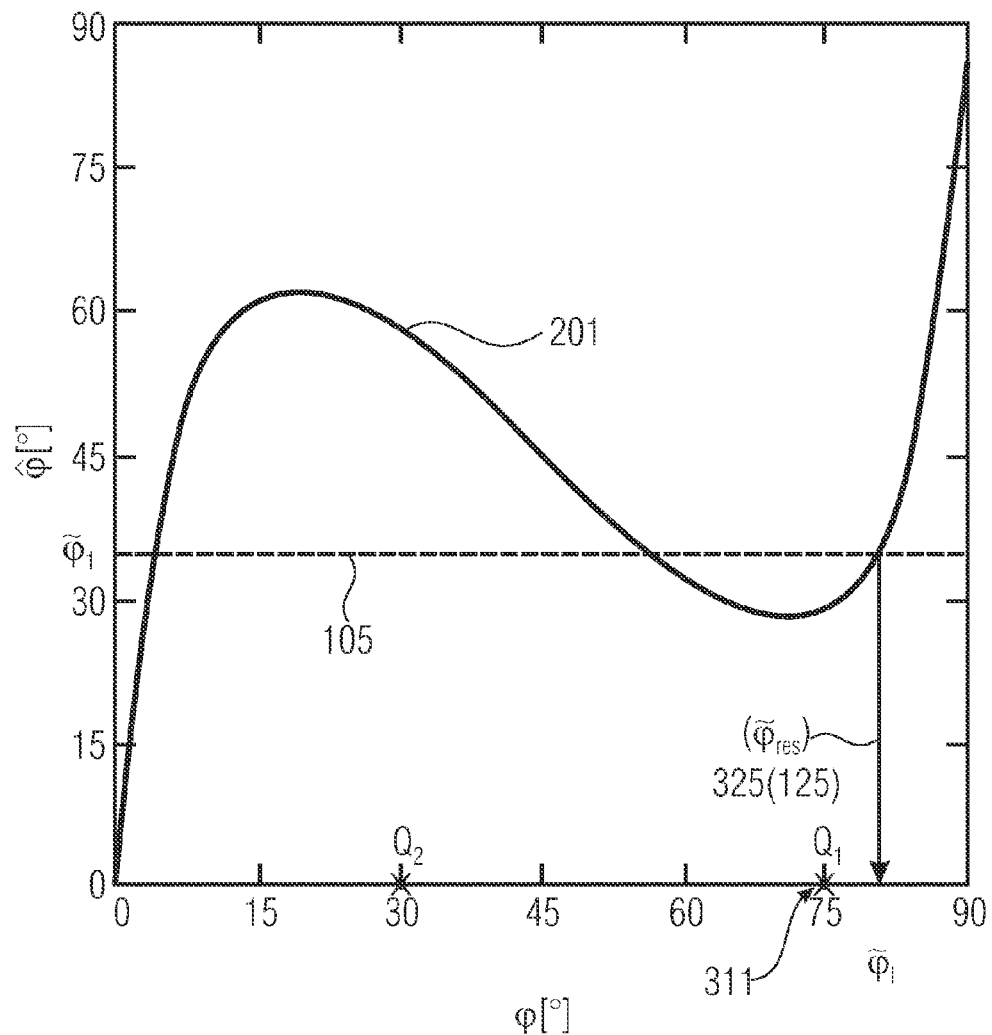
FIG. 19 shows an example graph of an estimated DOA as a function of the unbiased DOA according to a further embodiment of the present invention.

According to further embodiments, there is also the possibility to perform an instantaneous correction with more than one active source. There can be the case that more than one source is active at a time. The exemplary source localization technique described before is capable of counting and locating multiple sources. The bias and non-uniqueness resolution procedure as described previously can be extended for operation with more than one active source. Therefore, we first execute the procedure as described in the embodiment of FIG. 3. We obtain a multitude of candidates for the corrected DOA for one estimated DOA $\hat{\phi}$. Now we can analyze the distances of these candidates not to one actual source but to more than one. In FIG. 19 there is a sketch of an example with two active sources $Q_1$ and $Q_2$. Since we assume that the estimated DOA beyond spatial aliasing corresponds to one of the active sources, we can assign the corrected DOA to those of the candidate, which lies closest to any active source in the space of corrected DOAs.

Specifically, FIG. 19 shows an estimated DOA $\hat{\phi}$ as a function of the unbiased DOA $\phi$. In case a source localization technique analyzes more than one active source, we assign the one of possible corrected, instantaneous DOAs to the unbiased, instantaneous DOA, which lies closest to any of the active sources (here: $Q_1$).

Let us consider the estimate of a source's DOA as a random variable. Then, this procedure is optimal in case of independent, identical, and symmetric distributions of each source's DOA estimate. If the distribution of each sources' DOA does not meet these requirements, we may employ more suitable distance measures. This case is treated in the following.

Figure 20:
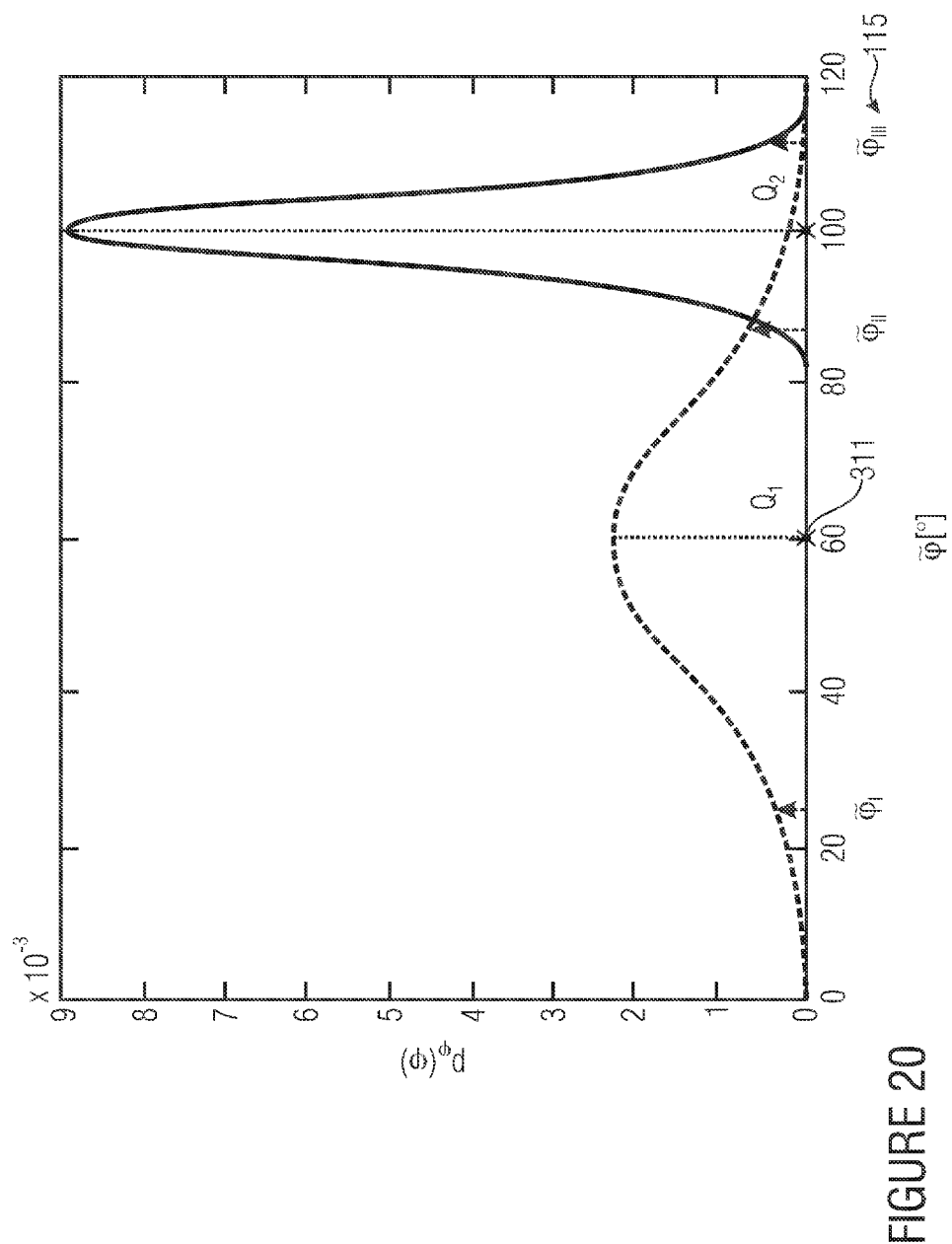
FIG. 20 shows an example graph of two active sources with their respective probability density functions according to an embodiment of the present invention.

A generic distribution of the active source's DOA is described. The source localization technique proposed in O. Thiergart, R. Schultz-Amling, G. Del Galdo, D. Mahne, and F. Kuech. Localization of sound sources in reverberant environments based on directional audio coding parameters. In 128th AES Convention, Paper 7853, New York City, N.Y., USA, October 2009 makes use of a probability density function (pdf) of the instantaneous DOAs at all frequency bands, that are negligibly affected by noise and bias. The above sketched examples return appropriate assignments of ambiguous DOAs, if the corresponding distributions are independent, identical, and symmetric. Normal distributions may serve as feasible approximations for each source's pdf. FIG. 20 sketches an exemplary scene with two active sources $Q_1$ and $Q_2$ (311). Their DOAs are not identically distributed. After ambiguity consideration we obtain three candidates for the corrected instantaneous DOA, $\tilde{\phi}_I$ to $\tilde{\phi}_{III}$. According to further embodiments, $\tilde{\phi}_{II}$ can be chosen as the proper candidate, because it has the smallest Mahalanobis distance to any active source. Even though the Euclidian distance to $Q_2$ is closer in this case, $Q_1$ is the closest source in the statistical sense.

Specifically, FIG. 20 shows two active sources at $Q_1=60°$ and $Q_2=100°$ with their respective pdfs. There are three candidates for the corrected instantaneous DOA, $\tilde{\phi}_I$ to $\tilde{\phi}_{III}$. $\tilde{\phi}_{II}$ is chosen as the proper candidate, because it has the smallest Mahalanobis distance to any active source ($Q_1$ in this case).

The Mahalanobis distance is one example for a more general distance measure; it is optimal with normal distributions. Other appropriate distance measures may be operated, as well, if the DOAs are distributed in a different way.

The embodiment of FIG. 4 refers to mapping of instantaneous DOAs to an active source's DOA. As previously noted, instantaneous DOAs can be modeled as random variables from a stochastic process with a certain variance around a certain mean. By considering the bias of instantaneous DOAs we modify mean and variance of the associated process but we maintain its stochastic nature. When we resolve the ambiguity, an alternative approach to selecting a proper candidate consists of replacing instantaneous DOA estimates with the DOA of the closest active source, e.g., $Q_i$. This means that the instantaneous DOA's stochastic nature is changed significantly by this kind of quantization step. If a successive application necessitates to recover a more realistic stochastic nature of the spatial parameter we propose to add a random variable to the active source's DOA. To give an example: It turns out that the perceived spatial audio quality after the DirAC synthesis is improved, if some randomness is introduced into the DOA parameter estimates (see FIG. 5). Without loss of generality, we define this random variable $\eta(k, m)$ to have zero mean and unit variance. We define a steering variance $\sigma_{st}^2$, in order to restore the instantaneous DOA's variance:

$$\tilde{\phi}_{dith,i}(k,m) = Q_i + \sigma_{st}(\hat{\phi}, \Psi)\eta(k,m). \qquad (7)$$

The steering variance can be defined as a function of the instantaneous DOA and DirAC's diffuseness parameter $\Psi$. Both parameters are time- and frequency-dependent, themselves. The time and frequency indices have just been omitted for better readability. Finally, mean and variance of $\tilde{\phi}_{dith,i}$ and $\hat{\phi}_i$ should match. Here, $\tilde{\phi}_{dith,i}$, $Q_i$ and $\sigma_{st}$; $\eta$ of Eq. 7 may correspond to $\tilde{\phi}_{dith}$ 535, $\phi_{Q_s}$ 525 and the variable numbers 545, respectively, shown in the embodiment of FIG. 5.

Note that the variance of the DOA estimates is analyzed by certain source localization algorithms, e.g., as described in O. Thiergart, R. Schultz-Amling, G. Del Galdo, D. Mahne, and F. Kuech. Localization of sound sources in reverberant environments based on directional audio coding parameters. In 128th AES Convention, Paper 7853, New York City, N.Y., USA, October 2009 and, therefore, it can be used to adjust the amount of dithering.

The embodiments of FIGS. 7 to 9 refer to adjusting subsequent processing units. All parameters of spatial audio codecs can be used to operate successive processing stages, e.g., DirAC Synthesis or directional filtering, as has been described before. If parameters like the instantaneous DOA are corrupted in any way, then correcting these parameters prior to successive processing stages is one way to achieve final high-quality output. Methods for correcting spatial parameters have been treated in the embodiments of FIGS. 2 to 4. As an alternative, we can adjust successive processing stages to an expected bias and ambiguities. Let us recap the concerning procedures on the basis of the generic structure in FIG. 16. In this case, the function f(•) represents, e.g., the directional filtering operation.

Basically, directional filtering works by multiplying spectral gains with a signal spectrum (see equation (6)). The design of the zero-phase transfer function can be illustrated by means of FIG. 21. The instantaneous DOA is mapped to a gain between zero and one. This procedure can be executed for each temporal block k and frequency band m.

Figure 21:
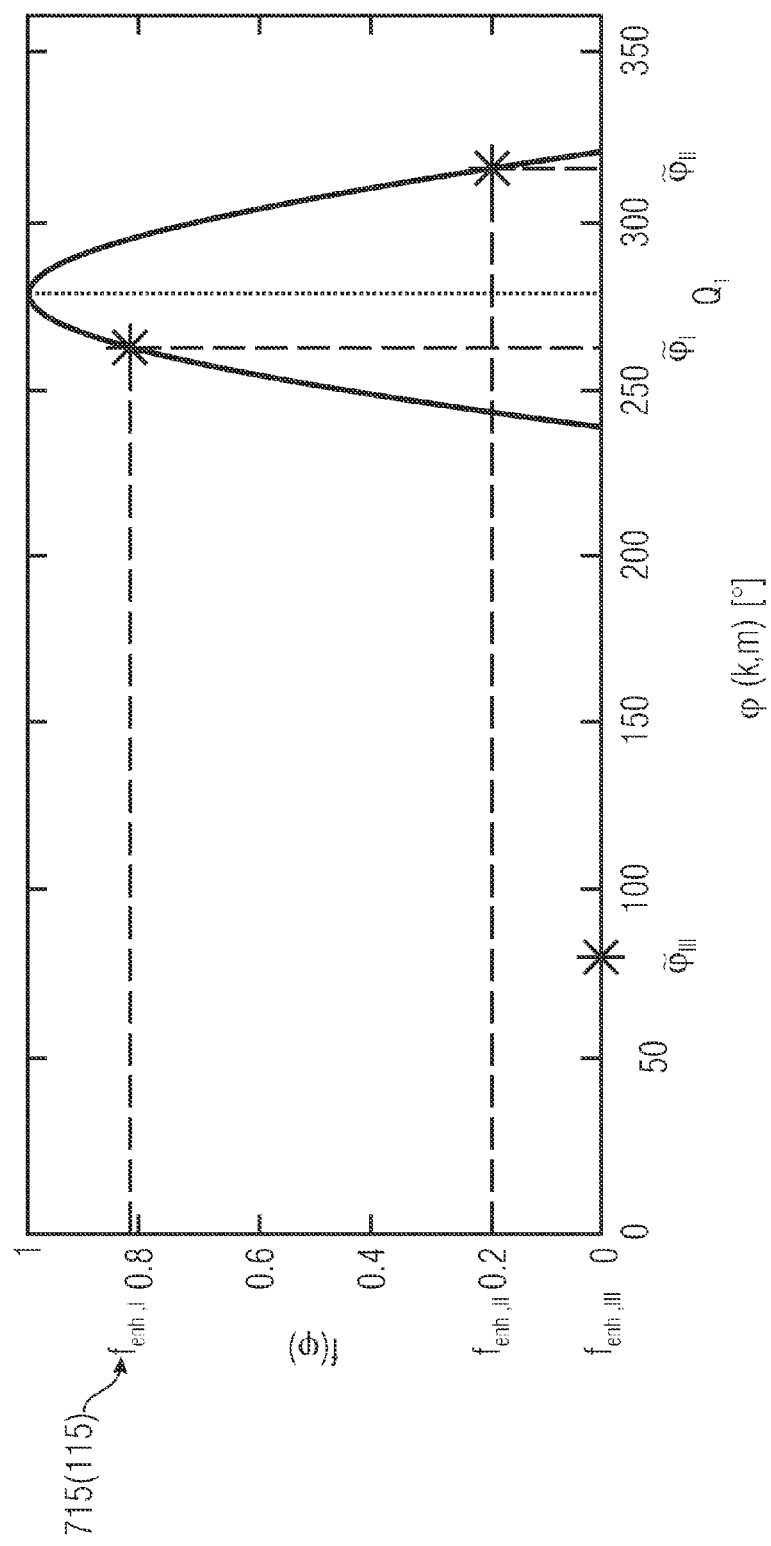
FIG. 21 shows an exemplary design function for directional filtering as a function of DOA according to an embodiment of the present invention.

Specifically, FIG. 21 shows an exemplary design function for directional filtering as a function of DOA. The function is employed at each temporal block k and frequency band m. The design function is "steered" under the assumption to have a desired active source at $Q_1=280°$.

It is important to note that the design rule relies on corrected instantaneous DOAs $\hat{\phi}(k, m)$. However, without ambiguity consideration we may operate the design rule on the basis of the primary estimates $\hat{\phi}(k, m)$.

As depicted in FIG. 16, a DOA parameter estimate 105, $\hat{\phi}$ is analyzed with respect to ambiguities. As a result we obtain a multitude of candidates for the desired DOA, $\tilde{\phi}_I$ to $\tilde{\phi}_N$. For each candidate $\tilde{\phi}_i$, a corresponding gain function or gain parameter 815, $f(\tilde{\phi}_i)$ is computed. The desired gain function $f(\hat{\phi})$, e.g., used for the actual directional filtering operation, can be obtained by appropriately combining the values provided by the different candidate functions $f(\tilde{\phi}_I)$ to $f(\tilde{\phi}_N)$. This is represented by the block "selection or combination" (ambiguity resolver 120 configured as a selector or combiner). Suitable combination rules include linear combinations (e.g. the mean) or non-linear combinations corresponding to a selection (e.g. the maximum or the minimum) of the different gain values.

Figure 22:
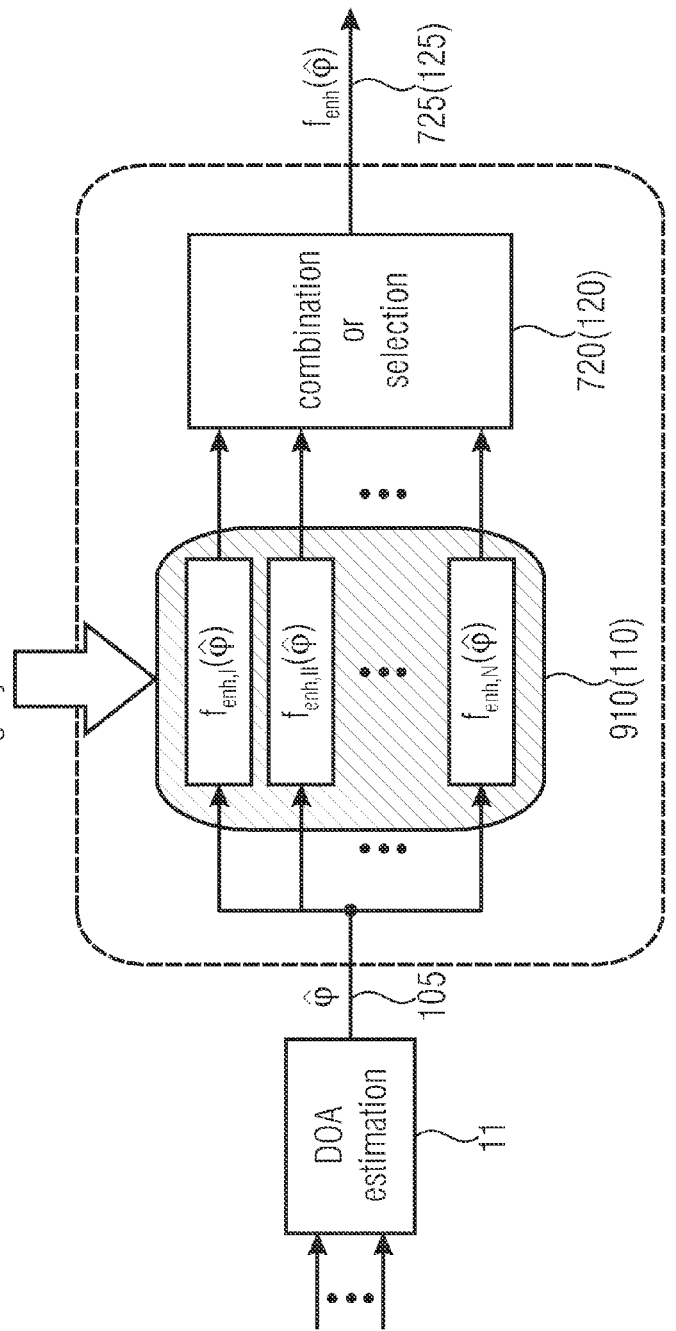
FIG. 22 shows a structure to adjust processing units, which operate as a function of an ambiguous DOA, to generate corrected output parameters according to an embodiment of the present invention.

From the above discussion it follows, that in the directional filtering application or the spatial audio synthesis stage, no a priori information about the locations of current sources is necessitated. It turns out that in this case the filtering operation and the ambiguity consideration can be merged in an efficient way. This approach is depicted in FIG. 22 and will be summarized in the following.

As before, the function $f(\bullet)$ describes the design of the directional filtering gain function as a function of the correct DOA $\phi(k, m)$:

$$D(k, m) = f(\phi(k, m)). \tag{8}$$

As we already know that $\phi(k, m)$ has to be replaced by the corresponding estimate $\hat{\phi}(k, m)$, we can expect incorrect behavior of the directional filtering gain function beyond the spatial aliasing frequency. To account for this ambiguity in the DOA estimation, we may introduce enhanced design functions 910, $f_{enh,1}(\hat{\phi})$ to $f_{enh,N}(\hat{\phi})$, which are chosen such that they reflect the ambiguity and potential bias of the DOA estimate. Regarding FIGS. 16 and 22, we have $$f_{enh,i}(\hat{\phi}) = f(\tilde{\phi}_i). \tag{9}$$

for i=I, . . . , N.

In embodiments, the desired enhanced gain function $f_{enh}(\hat{\phi}) = f(\hat{\phi})$ can be obtained by appropriately combining the different candidate gain values $f_{enh,I}(\hat{\phi})$ to $f_{enh,N}(\hat{\phi})$.

Specifically, FIG. 22 shows a structure to adjust processing units, which operate as a function of the ambiguous DOA, to generate corrected output parameters $f_{enh}(\hat{\phi})$. Ambiguities are resolved with respect to a desired application and not with respect to the actual DOA. In contrast to the system sketched in FIG. 17 no source localization unit is necessitated.

In the following, we give an example to illustrate how resolving the ambiguity in a processing stage, which succeeds the DOA estimator 11, allows to omit a source localization unit. Let us consider FIG. 21: we assume that an active source is located at $Q_1$; it is assigned to a gain of one. $\tilde{\phi}_I$, which is assigned to approx. 0.8, lies closest to it—it would be the chosen candidate, if we would proceed as described in the embodiment of FIG. 3. Here, we can combine the possible output gains. In embodiments, if the directional filtering's primary goal is to preserve the desired source signal's quality, we may choose the largest of all possible gains:

$$D_{max}(k, m) = \max_i f_{enh,i}(\hat{\varphi}(k, m)). \tag{10}$$

Contrarily, according to further embodiments, we might choose the smallest gain, if we wanted to suppress as much interferences as possible:

$$D_{min}(k, m) = \min_i f_{enh,i}(\hat{\varphi}(k, m)). \tag{11}$$

Depending on the actual application scenario, different strategies to combine the N functions $f_{enh,i}(\bullet)$, e.g., taking the mean, might also be an option. Considering the example in FIG. 21, it should be pointed out that a combination of the actual DOA candidates $\tilde{\phi}_I$ to $\tilde{\phi}_{III}$ does not represent an appropriate approach for resolving of DOA ambiguities in the directional filtering context.

Note that the combination of the functions $f_{enh,i}(\bullet)$ can be efficiently pre-computed on the basis of the array geometry and desired directional patterns (see FIG. 15). Thus, no additional computational load is generated during runtime of the algorithm, as the output of the present approach consists of a function of the estimated DOA and not of the corresponding corrected version.

In summary of the previous embodiments, the presented technique/concept may comprise the following steps. First, signals from a microphone array may be recorded. Then, the direction-of-arrival (DOA) may be estimated from these microphone signals. Then, an ambiguity of the DOAs may be resolved with the help of information about positions of active sound sources. This information can be available in advance and/or may be estimated during operation time. Alternatively, the ambiguity may be resolved not with respect to DOAs but parameters of successive processing stages, e.g., spectral gains. Finally, successive processing stages, e.g., directional filtering, can be applied.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive parameters can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

In summary, the present invention contains a strategy to resolve ambiguities caused by spatial aliasing. The ambiguities can be resolved either with respect to the spatial parameters or at subsequent processing units, which employ spatial parameters as their input.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for resolving an ambiguity from a direction of arrival estimate, the apparatus comprising:
a direction of arrival estimate analyzer for analyzing the direction of arrival estimate to acquire a plurality of ambiguous analysis parameters by using a bias information, the bias information representing a relation between a biased and an unbiased direction of arrival estimate; and
an ambiguity resolver for resolving the ambiguity in the plurality of ambiguous analysis parameters to acquire a non-ambiguous resolved parameter.

2. The apparatus according to claim 1, wherein the direction of arrival estimate analyzer is configured to relate the direction of arrival estimate to a plurality of ambiguous direction of arrival estimates based on a bias function, wherein the bias function is indicated by the bias information, and wherein the plurality of ambiguous direction of arrival estimates corresponds to the plurality of ambiguous analysis parameters, wherein the ambiguity resolver is configured to determine the non-ambiguous resolved parameter from the plurality of ambiguous direction of arrival estimates by using a priori spatial information of one or more active sources.

3. The apparatus according to claim 1, wherein the ambiguity resolver is configured as a selector for selecting the non-ambiguous resolved parameter from a plurality of ambiguous direction of arrival estimates, wherein the selector is configured to perform the selection of the non-ambiguous resolved parameter based on a measure of a distance between a localization estimate corresponding to an ambiguous direction of arrival estimate of the plurality of ambiguous direction of arrival estimates and a priori localization estimates of one or more active sources.

4. The apparatus according to claim 1, wherein the ambiguity resolver is configured as mapper for mapping the plurality of ambiguous direction of arrival estimates to the non-ambiguous resolved parameter, wherein the mapper is configured to perform the mapping of the plurality of ambiguous direction of arrival estimates based on a measure of a distance between a localization estimate corresponding to an ambiguous direction of arrival estimate of the plurality of ambiguous direction of arrival estimates or a selected localization estimate corresponding to a selected direction of arrival estimate selected from the plurality of ambiguous direction of arrival estimates and a priori localization estimates of one or more active sources.

5. The apparatus according to claim 4, wherein the mapper comprises a number generator for generating variable numbers over time, and a combiner for combining a number of the variable numbers and a determined a priori localization estimate corresponding to a determined direction of arrival of the one or more active sources to acquire a modified direction of arrival related value, wherein the non-ambiguous resolved parameter corresponds to the modified direction of arrival related value.

6. The apparatus according to claim 2, further comprising a spatial information provider for providing a priori spatial information of one or more active sources, wherein the spatial information provider is configured to provide the a priori spatial information based on an input parameter which is different from the direction of arrival estimate.

7. The apparatus according to claim 1, wherein the direction of arrival estimate analyzer is configured to generate a plurality of branches for each ambiguous analysis parameter of the plurality of ambiguous analysis parameters, wherein the plurality of branches reflects the ambiguity in the plurality of ambiguous analysis parameters, and wherein the direction of arrival estimate analyzer is configured to directly acquire the plurality of branches from the direction of arrival estimate or to further process a plurality of ambiguous direction of arrival estimates to acquire the plurality of branches, wherein the direction of arrival estimate analyzer is configured to calculate gain parameters for a spectral weighting operation, wherein the ambiguity resolver is configured to determine the non-ambiguous resolved parameter from the plurality of branches representing the ambiguous analysis parameters.

8. The apparatus according to claim 7, wherein the ambiguity resolver is configured as a combiner for combining the plurality of ambiguous analysis parameters represented by the plurality of branches to acquire a combined parameter representing the non-ambiguous resolved parameter.

9. The apparatus according to claim 7, wherein the ambiguity resolver is configured as a selector for selecting the non-ambiguous resolved parameter from the plurality of ambiguous analysis parameters represented by the plurality of branches.

10. The apparatus according to claim 7, wherein the direction of arrival estimate analyzer is configured to relate the direction of arrival estimate to a plurality of ambiguous direction of arrival estimates based on a bias function, wherein the bias function is indicated by the bias information, and to further process the plurality of ambiguous direction of arrival estimates to acquire the plurality of branches representing the ambiguous analysis parameters.

11. The apparatus according to claim 7, wherein the direction of arrival estimate analyzer and the ambiguity resolver are configured for acquiring the non-ambiguous resolved parameter in a single processing step such that a processing result representing the non-ambiguous resolved parameter is provided, which would be acquired if at least two processing steps were performed consecutively.

12. The apparatus according to claim 7, wherein the direction of arrival estimate analyzer comprises, for each branch of the plurality of branches, a parameter processing unit, wherein the parameter processing unit is configured to relate the direction of arrival estimate to a corresponding ambiguous analysis parameter.

13. The apparatus according to claim 1, further comprising a direction of arrival estimator for estimating the direction of arrival estimate from a spatial audio signal, wherein the spatial audio signal comprises an omnidirectional and a plurality of different directional dipole signals.

14. A method for resolving an ambiguity from a direction of arrival estimate, the method comprising:
analyzing the direction of arrival estimate to acquire a plurality of ambiguous analysis parameters by using a bias information, the bias information representing a relation between a biased and an unbiased direction of arrival estimate; and
resolving the ambiguity in the plurality of ambiguous analysis parameters to acquire a non-ambiguous resolved parameter.

15. A non-transitory storage medium having stored thereon a computer program comprising a program code for performing the method for resolving an ambiguity from a direction of arrival estimate, the method comprising:
analyzing the direction of arrival estimate to acquire a plurality of ambiguous analysis parameters by using a bias information, the bias information representing a relation between a biased and an unbiased direction of arrival estimate; and
resolving the ambiguity in the plurality of ambiguous analysis parameters to acquire a non-ambiguous resolved parameter,
when the computer program is executed on a computer.

* * * * *